United States Patent
Cafaro et al.

(10) Patent No.: US 12,264,631 B2
(45) Date of Patent: Apr. 1, 2025

(54) SYSTEM AND METHOD FOR SYNCHROPHASING A PROPULSION SYSTEM USING ELECTRIC MACHINES

(71) Applicant: General Electric Company, Schenectady, NY (US)

(72) Inventors: Stefan Joseph Cafaro, Chapel Hill, NC (US); Kalpesh Singal, Ballston Spa, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/335,366

(22) Filed: Jun. 15, 2023

(65) Prior Publication Data

US 2024/0418132 A1    Dec. 19, 2024

(51) Int. Cl.
*B64D 31/12*    (2006.01)
*B64C 11/50*    (2006.01)
(Continued)

(52) U.S. Cl.
CPC ............... *F02C 9/00* (2013.01); *B64C 11/50* (2013.01); *B64D 31/12* (2013.01); *F02K 3/00* (2013.01);
(Continued)

(58) Field of Classification Search
CPC . B64C 11/50; B64D 31/12; F02C 9/00; F02C 9/42; F02C 7/32; F02K 3/00;
(Continued)

(56) References Cited

U.S. PATENT DOCUMENTS

| | | | |
|---|---|---|---|
| 4,659,283 A | | 4/1987 | Niessen et al. |
| 5,027,277 A | * | 6/1991 | Schneider ............... B64C 11/50 416/34 |

(Continued)

FOREIGN PATENT DOCUMENTS

GB    636495 A    5/1950

OTHER PUBLICATIONS

Xianghua et al., Synchrophasing Control in a Multi-Propeller Driven Aircraft, 2015, 1836-1841. Retrieved Mar. 30, 2023 from http:/dx.doi.org/10.1109/ACC.2015.7171000.
(Continued)

*Primary Examiner* — Andrew H Nguyen
(74) *Attorney, Agent, or Firm* — Dority & Manning, P.A.

(57) ABSTRACT

A propulsion system includes at least two propulsors. The at least two propulsors each include a fan and a controller having one or more processors configured to implement controller logic. The controller logic includes a phase angle control scheme and a speed control scheme. In implementing the controller logic, the one or more processors are configured to: determine an actual pairwise phase difference between a pair of propulsors of the at least two propulsors; generate a reference phase angle for the pair of propulsors; compare the actual pairwise phase difference to the reference phase angle to generate a phase error; provide the phase error to a phase controller module to generate an output based on the phase error; and adjust a speed of at least one propulsor of the at least two propulsors based on the output to drive the phase error towards zero.

18 Claims, 11 Drawing Sheets

(51) Int. Cl.
*F02C 9/00* (2006.01)
*F02K 3/00* (2006.01)

(52) U.S. Cl.
CPC .... *F05D 2220/323* (2013.01); *F05D 2270/01* (2013.01); *F05D 2270/03* (2013.01)

(58) Field of Classification Search
CPC ............. F05D 2270/13; F05D 2270/01; F05D 2270/03; F05D 2270/02; F05D 2270/70; F05D 2270/703
See application file for complete search history.

(56) References Cited

U.S. PATENT DOCUMENTS

| | | |
|---|---|---|
| 5,291,410 A | 3/1994 | Metz |
| 5,551,649 A | 9/1996 | Kaptein |
| 7,611,329 B2 | 11/2009 | Nouhaud |
| 10,800,514 B2 | 10/2020 | Lisio |
| 10,801,360 B2 | 10/2020 | Yakobov |
| 2016/0178464 A1* | 6/2016 | Burns ........................ F02C 3/10 73/112.01 |
| 2020/0001978 A1* | 1/2020 | Yakobov ................... F02C 9/22 |
| 2020/0248619 A1* | 8/2020 | Romero .................... F02C 9/18 |
| 2020/0248622 A1* | 8/2020 | Crowley ................. F02C 7/057 |
| 2020/0408148 A1* | 12/2020 | Beauchesne-Martel ..................... B64D 31/12 |

OTHER PUBLICATIONS

Cao et al., A Flight Experimental Platform for Synchrophasing Control Based on a Small Propeller UAV, Science China Technological Sciences, vol. 61, 2018, 1915-1924. https://link.springer.com/article/10.1007/s11431-018-9329-0.

* cited by examiner

SYSTEM AND METHOD FOR SYNCHROPHASING A PROPULSION SYSTEM USING ELECTRIC MACHINES

FIELD

The present subject matter relates generally to a system and method of synchrophasing a propulsion system having two or more propulsors using electric machines coupled a shaft of each propulsor.

BACKGROUND

A conventional commercial aircraft generally includes a fuselage, a pair of wings, and a propulsion system that provides thrust. The propulsion system typically includes at least two aircraft engines, such as turbofan jet engines. Each turbofan jet engine is typically mounted to a respective one of the wings of the aircraft, such as in a suspended position beneath the wing, separated from the wing and fuselage. In an aircraft having two or more engines (i.e., a multi-engine aircraft), phase angle refers to the position of the fan blades on each engine relative to each other. When the fan blades of the engines do not have an optimal phase offset with respect to each other, or when the engines are not rotating at the same speed, it can result in an uneven application of power and torque, causing vibration and noise.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
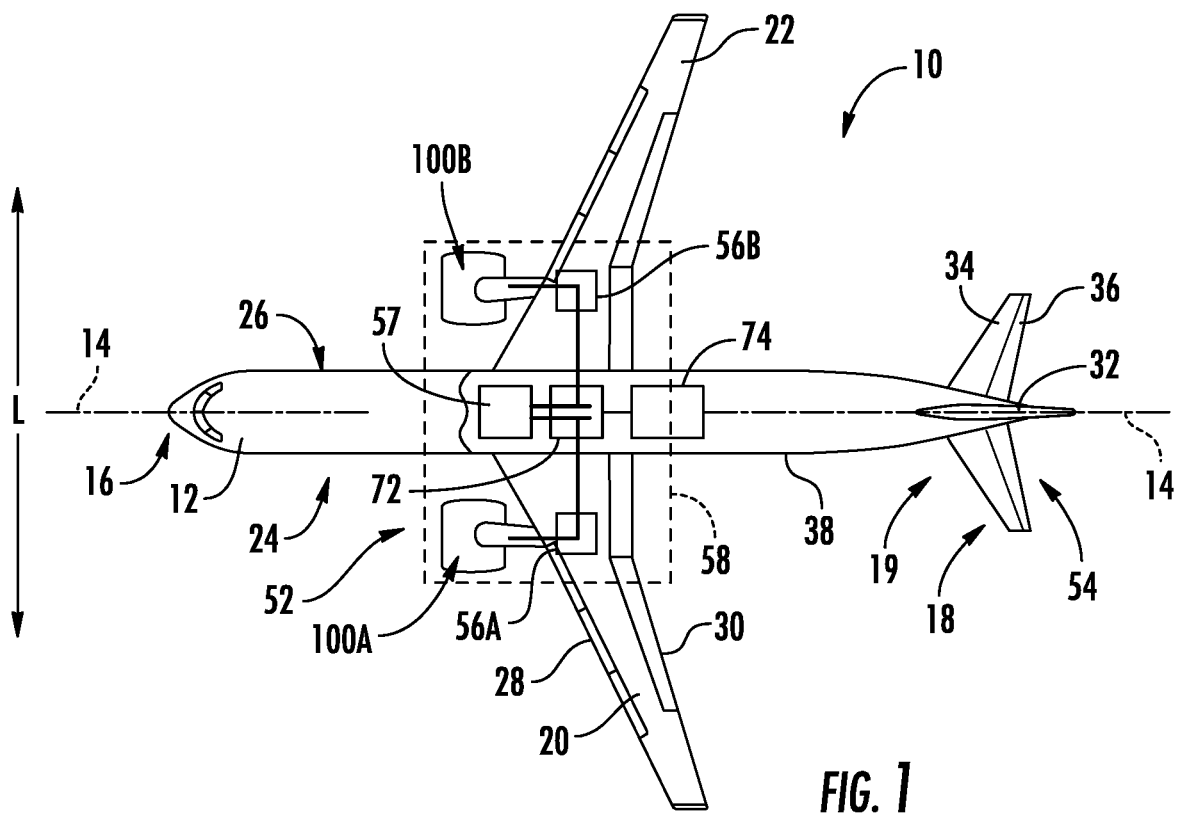
FIG. 1 is a top view of an aircraft according to various exemplary embodiments of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In an aircraft having two or more engines (i.e., a multi-engine aircraft), phase angle refers to the position of the fan blades on each engine relative to each other. When the fan blades of the engines do not have an optimal phase offset with respect to each other, or when the engines are not rotating at the same speed, it can result in an uneven application of power and torque, causing vibration and noise.

With a hybrid electric gas turbine engine, an electric machine may be coupled to one or both of the high pressure system and the low pressure system, such as to a shaft rotatable with the high pressure system and/or the low pressure system. The present disclosure utilizes the electric machine to facilitate synchronization of the phase angle and/or blade speed of the one or more engines in the aircraft. That is, the electric machines may be utilized to apply, extract, or transfer power into the fan and/or propeller shaft of the aircraft engines to accomplish synchronization of speed and/or blade phase from one or more engines to another. The use of embedded electric machines to synchro-phase advantageously allows for more rapid removal of phase error with minimal disruption to engine performance or control and can be applied and coordinated across multiple propeller engines either fuel driven or electric driven.

Figure 2:
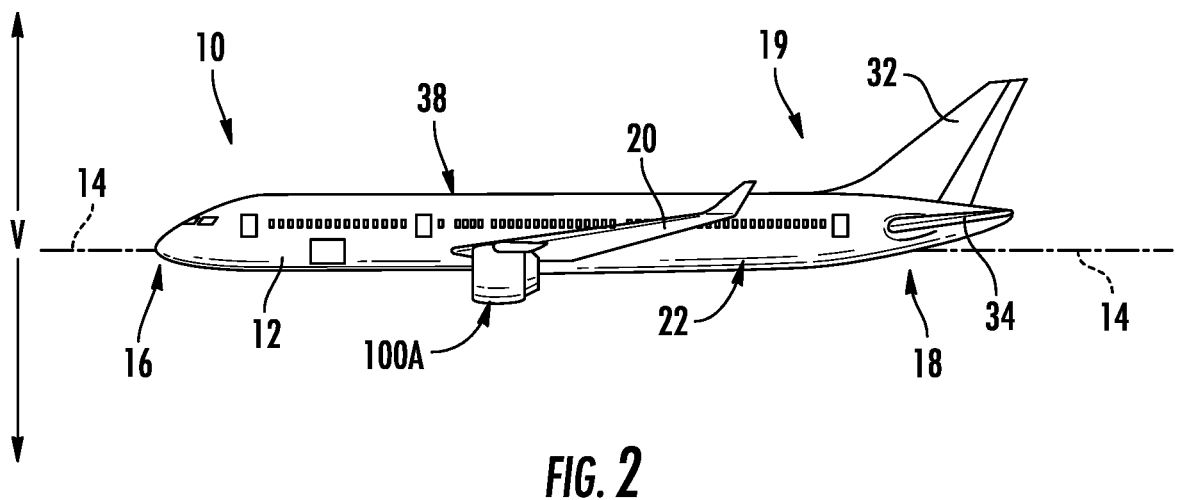
FIG. 2 is a side view of the exemplary aircraft of FIG. 1.

Referring now to the drawings, wherein identical numerals indicate the same elements throughout the figures, FIG. 1 provides a top, schematic view of an aircraft 10 having a hybrid-electric propulsion system 50 in accordance with still another exemplary embodiment of the present disclosure, and FIG. 2 provides a side, schematic view of the exemplary aircraft of FIG. 1. In particular, FIGS. 1 and 2 depict an aircraft 10, the aircraft 10 defining a longitudinal centerline 14 that extends therethrough, a lateral direction L, a forward end 16, and an aft end 18. The aircraft 10 includes a fuselage 12, an empennage 19, a first wing 20, and a second wing 22. The first and second wings 20, 22 each extend laterally outward with respect to the longitudinal centerline 14. The first wing 20 and a portion of the fuselage 12 together define a first side 24 of the aircraft 10, and the second wing 22 and another portion of the fuselage 12 together define a second side 26 of the aircraft 10. For the embodiment depicted, the first side 24 of the aircraft 10 is configured as the port side of the aircraft 10, and the second side 26 of the aircraft 10 is configured as the starboard side of the aircraft 10.

Each of the wings 20, 22 for the exemplary embodiment depicted includes one or more leading edge flaps 28 and one or more trailing edge flaps 30. The aircraft 10 further includes, or rather, the empennage 19 of the aircraft 10 includes, a vertical stabilizer 32 having a rudder flap (not shown) for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration. For example, in other embodiments, the aircraft 10 may include any other configuration of stabilizer.

The exemplary aircraft 10 of FIG. 1 additionally includes a hybrid-electric propulsion system 50 having a first gas turbine engine 100A, a second gas turbine engine 100B, and an electric energy storage unit 57. For the embodiment depicted, the first gas turbine engine 100A and second gas turbine engine 100B are each configured in an underwing-mounted configuration. Although FIG. 1 only depicts an aircraft having two gas turbine engines, the aircraft 10 may have any number of gas turbine engines, such as one per wing, two per wing, three per wing, or any other number of gas turbine engines.

Figure 3:
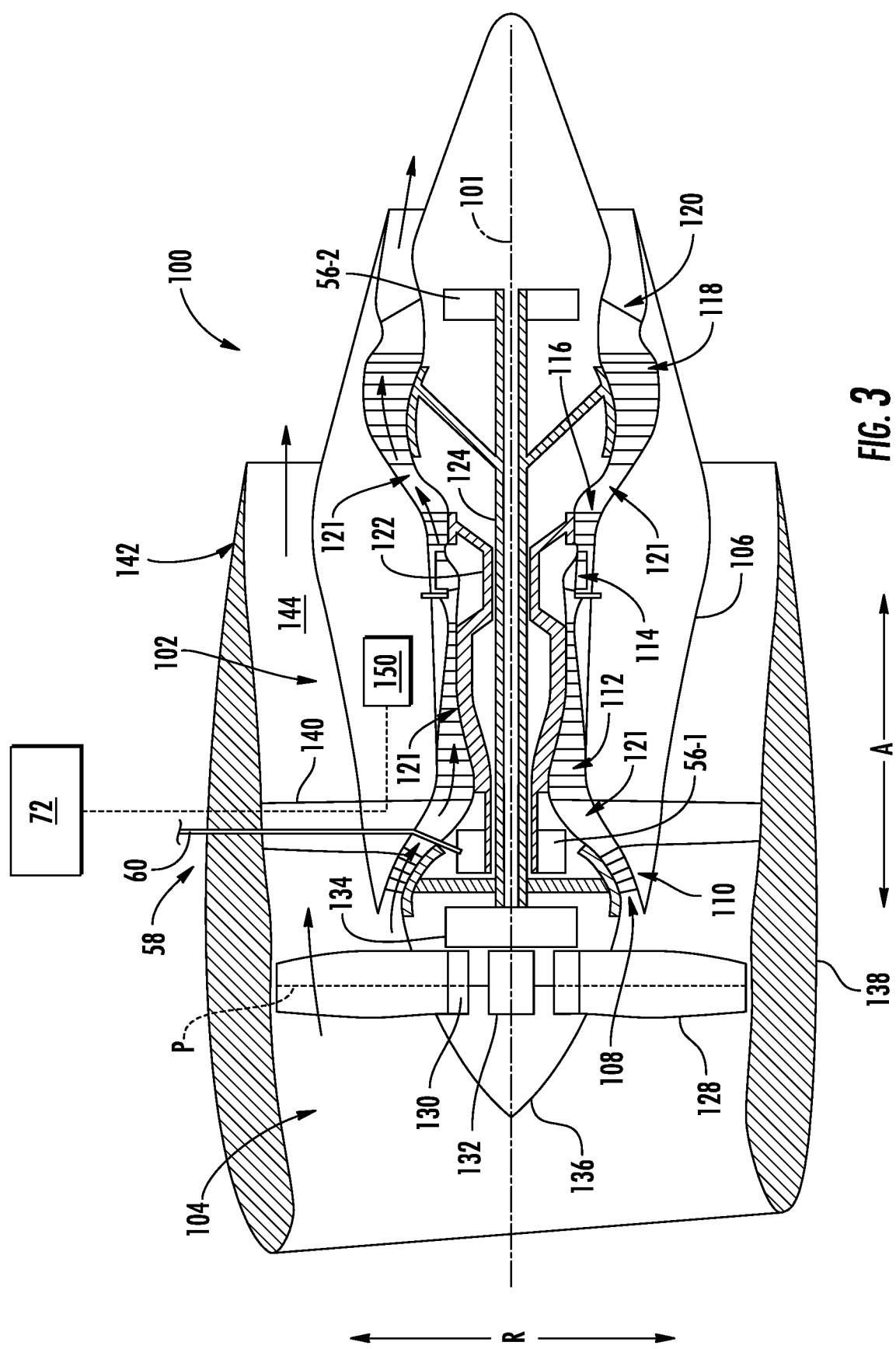
FIG. 3 is a schematic, cross-sectional view of a gas turbine engine in accordance with an exemplary embodiment of the present disclosure, as may be mounted to the exemplary aircraft of FIG. 1.

Referring now also to FIG. 3, a schematic, cross-sectional view is provided of a gas turbine engine 100. The first and second gas turbine engines 100A, 100B depicted in FIGS. 1 and 2 may be configured in a similar manner as the exemplary engine 100 of FIG. 3.

The gas turbine engine 100 of FIG. 3 is more particularly configured as a turbofan engine 100, including a turbomachine 102 and a fan 104. As shown in FIG. 3, the turbofan 100 defines an axial direction A (extending parallel to a longitudinal centerline 101 provided for reference) and a radial direction R. As stated, the turbofan 100 includes the fan 104 and the turbomachine 102 disposed downstream from the fan 104.

The exemplary turbomachine 102 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a first, high pressure (HP) turbine 116 and a second, low pressure (LP) turbine 118; and a jet exhaust nozzle section 120. The compressor section, combustion section 114, and turbine section together define at least in part a core air flowpath 121.

The exemplary turbomachine 102 of the turbofan 100 additionally includes one or more shafts rotatable with at least a portion of the turbine section and, for the embodiment depicted, at least a portion of the compressor section. More particularly, for the embodiment depicted, the turbofan 100 includes a high pressure (HP) shaft or spool 122, which drivingly connects the HP turbine 116 to the HP compressor 112. Additionally, the exemplary turbofan 100 includes a low pressure (LP) shaft or spool 124, which drivingly connects the LP turbine 118 to the LP compressor 110.

Further, the exemplary fan 104 depicted is configured as a variable pitch fan having a plurality of fan blades 128 coupled to a disk 130 in a spaced apart manner. The fan blades 128 extend outwardly from disk 130 generally along the radial direction R. Each fan blade 128 is rotatable relative to the disk 130 about a respective pitch axis P by virtue of the fan blades 128 being operatively coupled to a suitable actuation member 132 configured to collectively vary the pitch of the fan blades 128. The fan 104 is mechanically coupled to the LP shaft 124, such that the fan 104 is mechanically driven by the second, LP turbine 118. More particularly, the fan 104, including the fan blades 128, disk 130, and actuation member 132, is mechanically coupled to the LP shaft 124 through a power gearbox 134, and is rotatable about the longitudinal axis 101 by the LP shaft 124 across the power gear box 134. The power gear box 134 includes a plurality of gears for stepping down the rotational speed of the LP shaft 124 to a more efficient rotational fan speed. Accordingly, the fan 104 is powered by an LP system (including the LP turbine 118) of the turbomachine 102.

Referring still to the exemplary embodiment of FIG. 3, the disk 130 is covered by rotatable front hub 136 aerodynamically contoured to promote an airflow through the plurality of fan blades 128. Additionally, the turbofan 100 includes an annular fan casing or outer nacelle 138 that circumferentially surrounds the fan 104 and/or at least a portion of the turbomachine 102. Accordingly, the exemplary turbofan 100 depicted may be referred to as a "ducted" turbofan engine. Moreover, the nacelle 138 is supported relative to the turbomachine 102 by a plurality of circumferentially-spaced outlet guide vanes 140. A downstream section 142 of the nacelle 138 extends over an outer portion of the turbomachine 102 so as to define a bypass airflow passage 144 therebetween.

Referring still to FIG. 3, the hybrid-electric propulsion system 50 additionally includes an electric machine 56, which for the embodiment depicted may be configured as an electric motor/generator. The electric machine 56 is, for the embodiment depicted, positioned within the turbomachine 102 of the turbofan engine 100 and is in mechanical communication with one of the shafts of the turbofan engine 100. More specifically, for the embodiment depicted, the electric machine 56 is a first electric machine 56-1, and is positioned inward of the core air flowpath 121, driven by the first, HP turbine 116 through the HP shaft 122. The first electric machine 56-1 is configured to convert mechanical power of the HP shaft 122 to electric power during certain operations, and further is configured to convert electrical power to mechanical power in other operations. Accordingly, the first electric machine 56-1 may be powered by the HP system (including the HP turbine 116) of the turbomachine 102 during certain operations and may power the HP system during other operations.

Further for the embodiment depicted, the hybrid-electric propulsion system 50 additionally includes a second electric machine 56-2. The second electric machine 56-2 is configured to convert mechanical power of the LP shaft 124 to electric power during certain operations, and further is configured to convert electrical power to mechanical power in other operations. Accordingly, the second electric machine 56-2 may be powered by the LP system (including the LP turbine 118 and the fan 104) of the turbomachine 102 during certain operations and may power the LP system during other operations.

Notably, the electric machines 56-1, 56-2 may be relatively powerful motor/generators. For example, during certain operations, the electric machines 56-1, 56-2 may be configured to generate at least about fifty kilowatts of electrical power or at least about sixty-five horsepower of mechanical power. In other embodiments, however, the electric machines 56-1, 56-2 may generate other amounts of power. In other embodiments, the electric machines 56-1, 56-2 may be configured to generate up to two hundred kilowatts of electrical power.

It should be appreciated, however, that in other exemplary embodiments, the electric machines 56-1, 56-2 may instead be positioned at any other suitable location within the turbomachine 102 or elsewhere, and may be, e.g., powered in any other suitable manner. For example, the first electric machine 56-1 may be, in other embodiments, mounted coaxially with the HP shaft 122 within the turbine section, or alternatively may be offset from the HP shaft 122 and driven through a suitable gear train. Similarly, the second electric machine 56-2 may be, in other embodiments, mounted coaxially with the LP shaft 124 within the compressor section, or alternatively may be offset from the LP shaft 124 and driven through a suitable gear train. Additionally, or alternatively, still, in other embodiments, the hybrid electric propulsion system 50 may not include both the first and second electric machines 56-1, 56-2, and instead may only include one of such electric machines 56-1, 56-2.

It should further be appreciated that the exemplary turbofan engine 100 depicted in FIG. 3 may, in other exemplary embodiments, have any other suitable configuration. For example, in other exemplary embodiments, the fan 104 may not be a variable pitch fan, and further, in other exemplary embodiments, the LP shaft 124 may be directly mechanically coupled to the fan 104 (i.e., the turbofan engine 100 may not include the gearbox 134). Further, it should be appreciated that in other exemplary embodiments, the first propulsor 52 may include any other suitable type of engine. For example, in other embodiments, the turbofan engine 100 may instead be configured as a turboprop engine or an unducted turbofan engine. Additionally, in still other embodiments, the turbofan engine 100 may instead be configured as any other suitable combustion engine for driving the electric machines 56-1, 56-2. For example, in other embodiments, the turbofan engine may be configured as a turboshaft engine, or any other suitable combustion engine (such as an unducted, open rotor engine).

Referring still to FIGS. 1 and 2, the turbofan engine 100 further includes a controller 150, and although not depicted, one or more sensors. The controller 150 may be a full authority digital propulsor control system, also referred to as a FADEC. The controller 150 of the turbofan engine 100 may be configured to control operation of, e.g., the actuation member 132, a fuel delivery system 151 to the combustion section 114 (the controller 150 may be operable to adjust an amount of fuel provided to the combustion section 114 by the fuel delivery system 151), etc. Additionally, the controller 150 may be operably connected to the one or more sensors to receive data from the sensors and determine various operational parameters of the turbofan engine 100. For example, the controller 150 may determine one or more of an exhaust gas temperature, a rotational speed of the core (i.e., a rotational speed of the HP shaft 122 or the LP shaft 124), a compressor discharge temperature, etc. Further, referring back also to FIG. 1, the controller 150 of the turbofan engine 100 is operably connected to the controller 72 of the hybrid-electric propulsion system 50. Moreover, as will be appreciated, the controller 72 may further be operably connected to one or more of the first and second gas turbine engines 100A, 100B, the energy storage unit 57, etc. through a suitable wired or wireless communication system (depicted in phantom).

Referring back particularly to FIGS. 1 and 2, an electrical system of the hybrid-electric propulsion system 50 includes one or more electric machines (e.g., electric machine 56A, depicted schematically) mechanically coupled to the first gas turbine engine 100A and one or more electric machines (e.g., electric machine 56B, depicted schematically) mechanically coupled to the second gas turbine engine 100B. Although depicted schematically outside the respective gas turbine engines 100A, 100B, in certain embodiments, the electric machines 56A, 56B may be positioned within a respective one of the gas turbine engines 100A, 100B (see, e.g., FIG. 3). Further, although a single electric machine is depicted with each gas turbine engine 100A, 100B, in certain embodiments, a plurality of electric machines 56A, 56B may be provided for each (e.g., electric machines 56A-1, 56A-2 with gas turbine engine 100A, electric machines 56B-1, 56B-2 with gas turbine engine 100B).

Moreover, as briefly mentioned above with reference to FIG. 3, for the embodiment of FIGS. 1 and 2 the hybrid electric propulsion assembly 50 further includes a controller 72. As will be appreciated, the energy storage unit 57 may be configured, in certain operating conditions, to receive electrical power from one or both of the first electric machine 56A and the second electric machine 56B, and may further be configured in certain operating conditions to provide stored electrical power to one or both of the first electric machine 56A and the second electric machine 56B. Moreover, the controller 72 is operably connected to turbofan engines 100A, 100B, electric machines 56A, 56B, and energy storage unit 57 to, e.g., control operations of the hybrid electric propulsion system 50 and selectively electrically connect components of the hybrid electric propulsion system 50 during the various operating conditions.

Further, the controller 72 may be in communication with one or more aircraft controllers for receiving data indicative of an aircraft need for electrical power, and may in response provide electrical power from one or more of the electric machines 56A, 56B and the energy storage unit 57 to an aircraft load 74.

It should be appreciated, however, that in still other exemplary embodiments of the present disclosure, any other suitable aircraft 10 may be provided having a hybrid-electric propulsion system 50 configured in any other suitable manner. For example, in other embodiments, the turbofan engines 100A, 100B may each be configured as any other suitable combustion engine (e.g., turboprop engine, unducted turbofan engine, turboshaft engine, turbojet engine, etc.), and may be mounted at any other suitable location.

Moreover, in still other exemplary embodiments, the exemplary hybrid electric propulsion system 50 may have still other configurations. For example, referring now briefly to FIG. 4, a schematic diagram of a hybrid-electric propulsion system 50 in accordance with yet another exemplary embodiment of the present disclosure is provided. The exemplary hybrid electric propulsion system 50 depicted in FIG. 4 may be similar to one or more the exemplary hybrid electric propulsion systems 50 described above with reference to FIGS. 1 through 3.

In various embodiments, the hybrid electric propulsion system 50 may include at least two propulsors. For example, the hybrid electric propulsion system 50 may include a first propulsor 52 and a second propulsor 54. The first propulsor 52 generally includes a first engine 100A having first turbomachine 102A and a first fan 104A, and a second engine 100B having a second turbomachine 102B and a second fan 104B. Each of the first and second turbomachines 102A, 102B generally includes a low pressure system having a low pressure compressor 110A, 110B drivingly coupled to a low pressure turbine 118A, 118B through a low pressure shaft 124A, 124B as well as a high pressure system having a high pressure compressor 112A, 112B drivingly coupled to a high pressure turbine 116A, 116B through a high pressure shaft 122A, 122B.

Additionally, the first fan 104A is drivingly coupled to the low pressure system of the first turbomachine 102A (e.g., via the low pressure shaft 124A) and the second fan 104B is drivingly coupled to the low pressure system of the second turbomachine 102B (e.g., via the high pressure shaft 124B). In certain exemplary embodiments, the first fan 104A and first turbomachine 102A may be configured as a first turbofan engine and, similarly, the second fan 104B and second turbomachine 102B may be configured as a second turbofan engine (see, e.g., FIG. 3). Alternatively, however, these components may instead be configured as parts of a turboprop engine or any other suitable turbomachine-driven propulsion device.

Figure 4:
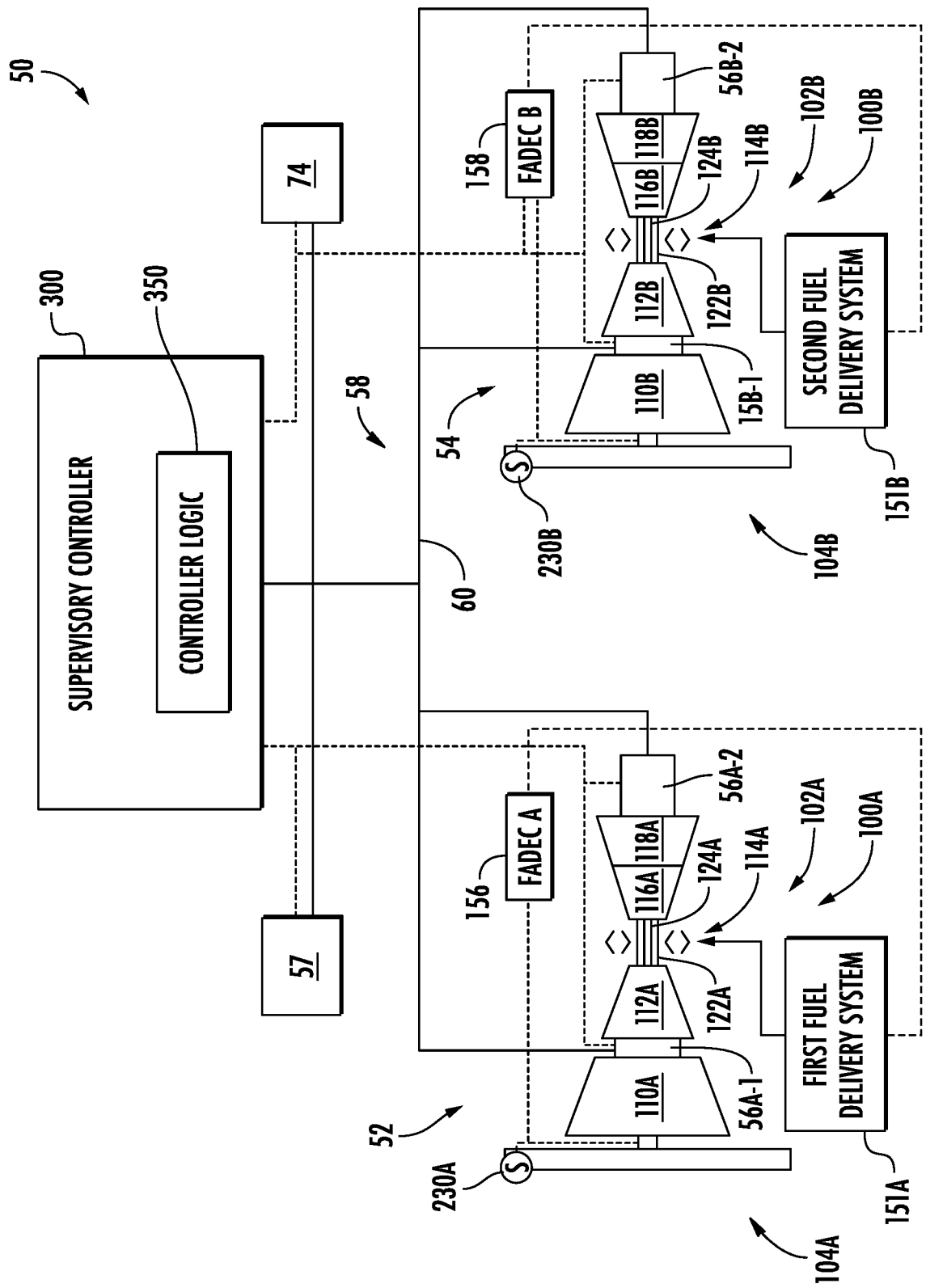
FIG. 4 is a schematic view of a propulsion system in accordance with an exemplary embodiment of the present disclosure.

Moreover, the hybrid electric propulsion system 50 of FIG. 4 additionally includes an electrical system. More specifically, the hybrid electric propulsion system 50 includes one or more electric machines operable with the first engine 100A, the second engine 100B, or both, and an electric energy storage unit 57 electrically connectable to one or more of these electric machines. In particular, for the embodiment depicted, the hybrid electric propulsion system 50 includes a first electric machine 56A-1 and a second electric machine 56A-2 operable with the first engine 100A and a first electric machine 56B-1 and a second electric machine 56B-2 operable with the second engine 100B.

More specifically, for the embodiment depicted in FIG. 4, the first electric machines 56A-1, 56B-1 are each coupled to the high pressure systems of the respective turbomachines 102A, 102B (such as coupled to the high pressure shaft 124A, 124B) and the second electric machines 56A-2, 56B-2 are each coupled to the low pressure systems of the respective turbomachines 102A. 102B (such as coupled to the low pressure shaft 122A, 122B).

In many embodiments, each of the turbomachines 100A, 100B may each include a fuel delivery system 151A, 151B. For example, the first turbomachine 100A may include a first fuel delivery system 151A that is fluidly connected with the combustion section 114A of the first turbomachine 100A. Similarly, the second turbomachine 100B may include a second fuel delivery system 151B that is fluidly connected with the combustion section 114B of the second turbomachine 100B. The fuel delivery systems 151A, 151B may each include one or more fuel supplies (such as a fuel tank), one or more fuel pumps, one or more valves, and a fuel controller. The Fuel delivery systems 151A, 151B may be operable to adjust an amount of fuel supplied to the respective combustion systems 114A, 114B (e.g., by actuating the one or more valves). The fuel controller for each fuel delivery system 151A, 151B may be integrated into the FADEC or may be a standalone controller. The fuel controller may be operably connected to one or more pumps and/or the one or more valves of the fuel delivery system, such that the fuel controller may adjust an amount of fuel supplied to the combustion section (e.g., by setting a fuel command, thereby actuating the one or more valves and/or modifying a power level of the one or more pumps).

As is also depicted in FIG. 4, the exemplary hybrid electric propulsion system 50 further includes a power bus 58. The first electric machines 56A-1, 56A-2, the second electric machines 56B-1, 56B-2, and the electric energy storage unit 57 are each electrically connectable to one another through one or more electric lines 60 of the power bus 58. For example, the power bus 58 may include various switches or other power electronics movable to selectively electrically connect the various components of the hybrid electric propulsion system 50, and optionally to convert or condition such electrical power transferred therethrough. The various switches and other power electronics may be operably coupled to the controller, such that the controller may control the power flow to and/or from the first electric machines 56A-1, 56A-2, the second electric machines 56B-1, 56B-2, and the electric energy storage unit 57.

Moreover, as is also depicted in the example of FIG. 4, the power bus 58 is electrically connected to one or more aircraft systems 74 for providing electrical power from one or more of the first electric machines 56A-1, 56A-2, the second electric machines 56B-1, 56B-2, and the electric energy storage unit 57 to the one or more aircraft systems 74. The one or more aircraft systems 74 may include, e.g., environmental controls, aircraft controls, hydraulic systems, pumps, de-icing systems, navigation, illumination, heating, etc.

In many embodiments, the propulsion system 50 may include one or more sensors operably connected to any of (or all of) FADEC A 156, FADEC B 158, and the supervisory controller 300, such that the one or more sensors may provide sensed data to the controllers. The one or more sensors may each be coupled to a propulsor 52, 54 and may each be configured to sense data indicative of an angle of the fan blades relative to a reference line. For example, the one or more sensors may include a first sensor 230A coupled to the first propulsor 52 and a second sensor 230B coupled to the second propulsor 54. The first sensor 230A may be operable to sense data indicative of a first angle of the blades of the first fan 104A relative to a reference line (such as a vertical reference line). Similarly, the second sensor 230B may be operable to sense data indicative of a second angle of the blades of the second fan 104B relative to a reference line (such as a vertical reference line). The supervisory controller 300 may receive the data indicative of the first angle and the data indicative of the second angle, and the supervisory controller 300 may determine a pairwise phase difference between the first propulsor and the second propulsor (i.e., or a phase angle between the first propulsor 52 and the second propulsor).

In addition, the system depicted in FIG. 4 includes a supervisory controller 300, which may be similar to controller 72 described above, a first gas turbine engine controller 156 (which may be, e.g., a FADEC controller) and a second gas turbine engine controller 158 (which may also be, e.g., a FADEC controller). The supervisory controller 300 may receive data indicative of one or more operability parameters of the first gas turbine engine 100A, the second gas turbine engine 100B, or both. For example, the exemplary supervisory controller 300 may receive data indicative of: one or more fuel flows, one or more operating temperatures (e.g., an exhaust gas temperature, compressor exit temperature, turbine inlet temperature, etc.), one or more speeds of the gas turbine engines (e.g., a rotational speed of the LP shaft 124, a rotational speed of the HP shaft 122, a rotational speed of the fan/propeller, etc.), a phase angle difference between the fan/propeller of each propulsor, one or more shaft torques, one or more pressure measurements, one or more thrust outputs (which may be, e.g., a calculation from a combination of a fan/propeller speed and a fan/propeller pitch angle), identifying serial numbers of component or other unique component identifiers (such as of the one or more engines), estimates or measurements of component consumed or residual life or performance, any combination of these or calculation derived from these, etc.

Particularly, the supervisory controller 300 may receive, e.g., from the sensors 230A, 230B, data indicative of an angle of the fan blades of each of the fans 104A, 104B relative to a vertical reference line at an instance in time. The supervisory controller 300 may utilize the data indicative of the angle to determine a phase angle between the first fan 104A and the second fan 104B. As used herein, in an aircraft or propulsion system having multiple propulsors, "phase angle" refers to the position of the fan blades on a first fan of a first propulsor of the multiple propulsors relative to the position of the fan blades on a different fan of a different propulsor the multiple propulsors.

The supervisory controller 300 includes controller logic 350. The controller logic 350 can be a set of computer-executable instructions stored in the memory that, when executed by one or more processors of the supervisory controller 300, cause the one or more processors to implement a synchrophasing control scheme. In implementing the synchrophasing control scheme, the one or more processors can: determine a phase error and a speed error; provide the phase error to a phase control module to generate an output (such as a speed reference modifier or an electric machine command) that (when implemented) drives the phase error towards zero; and provide the speed error to a fuel control module to generate a fuel command that (when implemented) drives the speed error towards zero. The electric machine command and the fuel command may be implemented by adjusting the speed of one or more propulsors of the at least two propulsors. Adjusting the speed the propulsor(s) may include adjusting an amount of power transferred between the electric machines 56A-1, 56A-2, 56B-1, 56B-2 and the shaft 122 and/or 124 based on the electric machine power command. For example, adjusting an amount of power transferred between the electric machines 56A-1, 56A-2, 56B-1, 56B-2 and the shaft 122 and/or 124 may include any of the following: (1) transferring power from the first engine 100A to the second engine 100B, or vice versa; (2) transferring power from the electric energy storage unit 57, the first engine 100A, or both to the second engine 100B, or from the electric energy storage unit 57, the second engine 100B, or both to the first engine 100A; (3) transferring power from a low pressure system of one of the first or second engines 100A. 100B to a high pressure system of the same engine, or vice versa; and/or (4) extracting a different amount of power from the first and second engines 100A. 100B. In such a manner, the system may adjust the phase angle between the fans 104A, 104B to a reference phase angle (such as zero in some embodiments, or non-zero in other embodiments and/or may synchronize the speed of the fans 104A, 104B.

Figure 5:
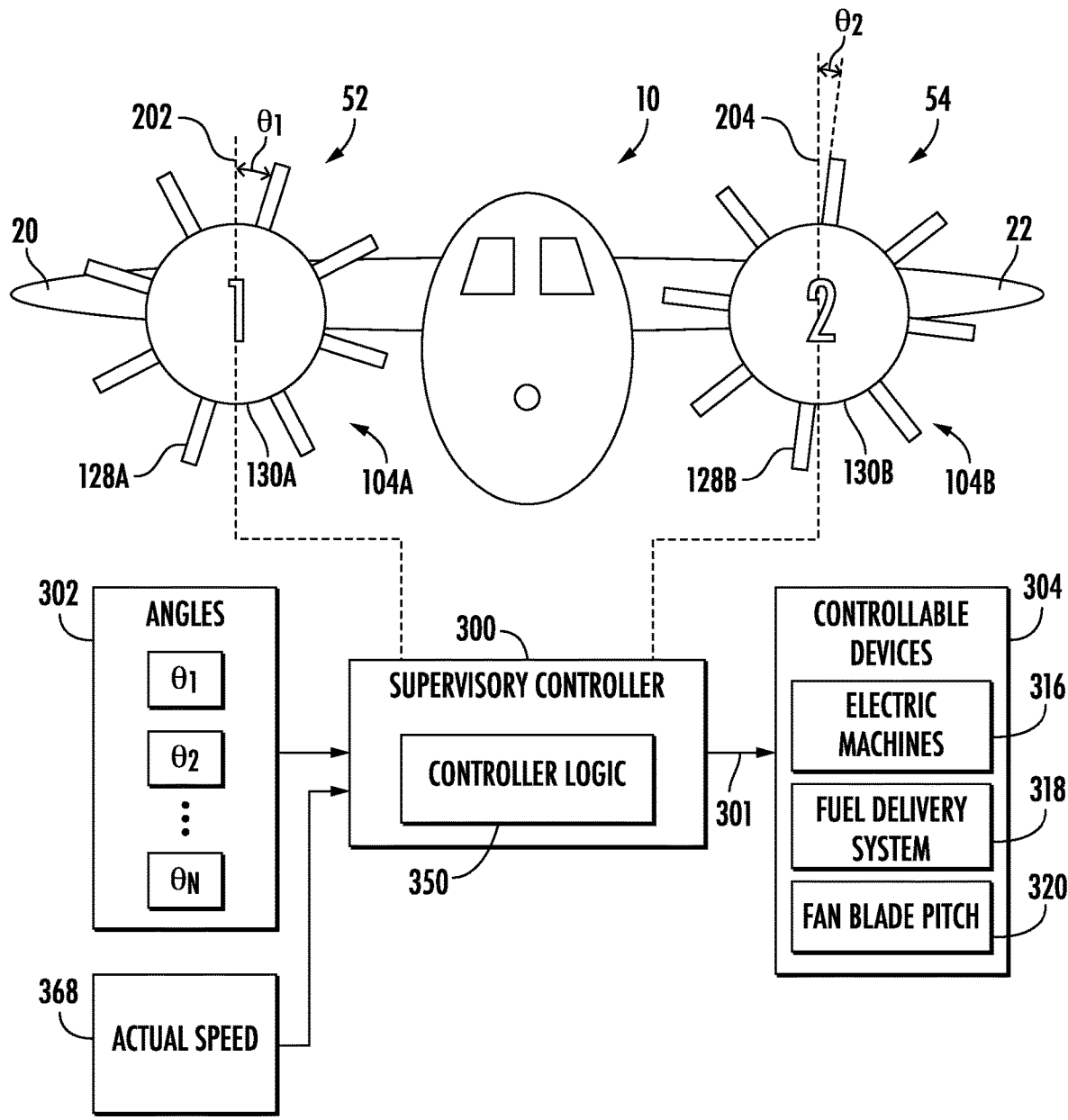
FIG. 5 is a front view of an aircraft having a propulsion system with two propulsors in accordance with embodiments of the present disclosure.

FIG. 5 illustrates a schematic view of an aircraft 50 having a propulsion system 50 with at least two propulsors in accordance with embodiments of the present disclosure. Particularly, FIG. 5 illustrates a propulsion system 50 having two propulsors (e.g., a first propulsor 52 mounted on a first wing 20 of the aircraft 10, and a second propulsor 54 mounted on the second wing 22 of the aircraft 10). Each of the propulsors 52, 54 may be configured similarly to the gas turbine engine 100 shown in FIG. 3 and described above.

Each of the propulsors 52, 54 may include a fan (e.g., a first fan 104A and a second fan 104B) having a plurality of fan blades. For example, the first fan 104A may have a first plurality of fan blades 128A that extend outwardly (e.g., radially outwardly) from a first disk 130A, and the second fan 104B may have a second plurality of fan blades 128B that extend outwardly (e.g., radially outwardly) from a second disk 130B. Referring briefly back to FIG. 3, each fan blade 128 may be rotatable relative to the disk 130 about a respective pitch axis P by virtue of the fan blades 128 being operatively coupled to a suitable actuation member 132 configured to collectively vary the pitch of the fan blades 128.

Each of the propulsors 52, 54 may define a top dead center (TDC) reference line. The TDC reference line may extend vertically (e.g., along the vertical direction V) through a center point of the respective propulsor 52, 54 (e.g., the TDC reference line may intersect the longitudinal centerline 101 shown in FIG. 3). Particularly, the first propulsor 52 may include a first TDC reference line 202, and the second propulsor 54 may include a second TDC reference line 204. Notably, the reference lines (such as the TDC reference lines) do not necessarily need to be vertical for calculation of the phase angles, so long as the reference line for each propulsor is similarly oriented (e.g., parallel) and extending through (or intersecting) the center of the respective propulsor.

The propulsion system 50 may include a supervisory controller 300, which may include one or more processors and one or more memory devices. Additionally, the supervisory controller 300 may include controller logic 350, which can be a set of computer-executable instructions stored in the memory that, when executed by one or more processors of the supervisory controller 300, cause the one or more processors to implement a synchrophasing control scheme.

The supervisory controller 300 may be in operable communication with each of the propulsors 52, 54, such that the supervisory controller 300 may receive data indicative of operating parameters associated with the propulsors 52, 54. For example, the exemplary supervisory controller 300 may receive data indicative of: one or more fuel flows, one or more operating temperatures (e.g., an exhaust gas temperature, compressor exit temperature, turbine inlet temperature, etc.), one or more speeds of the gas turbine engines (e.g., a rotational speed of the low pressure system, a rotational speed of the high pressure system, a rotational speed of the fan/propeller, etc.), one or more shaft torques, one or more pressure measurements, one or more thrust outputs (which may be, e.g., a calculation from a combination of a fan/propeller speed and a fan/propeller pitch angle), a vibration measurement or estimate of each engine or a vibration associated with a component of each engine, etc.

As shown in FIG. 5, at a particular instance in time (i.e., a moment in time), or over a time period, the supervisory controller 300 may determine or receive (e.g., by measuring, sensing, or estimating) an angles 302 between a propeller blade of each of the fans and a reference line, which may then be compared to one another to determine the pairwise phase difference. The angles 302 may be defined in the vertical-longitudinal plane (e.g., the plane of FIG. 5). For example, the first propulsor 52 defines a first angle $\theta_1$ between the first reference line 202 and a fan blade 128A of the first plurality of fan blades 128A closest to the first TDC reference line 202 at an instance in time. The second propulsor 54 defines a second angle $\theta_2$ between the second reference line 204 and a fan blade 128B of the second plurality of fan blades 128B closest to the second TDC reference line 204 at the instance in time.

In some embodiments, the supervisory controller 300 may receive the angles 302 from one or more sensors, e.g., the sensors 230 described above with reference to FIG. 4. In other embodiments, the angles 302 may be estimated (e.g., calculated), e.g., based on other operating parameters of the aircraft 10 and/or the propulsors 52, 54, such as the speed of the LP shaft, the speed of the HP shaft, and/or a vibration of the propulsors 52, 54.

The supervisory controller 300 may generate one or more control signals 301, which may be communicated to one or more controllable devices 304 of each of the propulsors 52, 54. For example, the controllable devices 304 may include electric machines 316, such as the electric machines 56-1 and 56-2 described above with reference to FIG. 3. The controllable devices 304 may further include a fuel delivery system 318, such as the fuel delivery system 151 described above with reference to FIGS. 3 and 4. The controllable devices 304 may further include a fan blade pitch 320, e.g., by actuating the actuation members 132 connected to the fan blades 128 (see FIG. 3).

The speed (rotational speed of the shafts) and angles 302 (and thus the phase angle between the propulsors) may be adjusted by the electric machines 316. For example, the electric machines 316 may adjust a rotational speed of the shaft to which they are attached, which may be accomplished by transferring power (e.g., adding or removing) between the electric machines 316 and the shafts. Particularly, in exemplary implementations, the phase angle may be adjusted by transferring power (e.g., adding power or removing power) between the electric machine 56-2 and the LP shaft. Additionally, the speed (e.g., rotational speed) and angles 302 (and thus phase angles) may be modified by adjusting an amount of fuel provided to the combustion section of the propulsors via the fuel delivery system 318. Further, speed and angles 302 (and thus phase angles) may be adjusted by adjusting the fan blade pitch 320.

FIGS. 6 through 9 each illustrate controller logic 350, which may be stored within, and implemented by, the supervisory controller 300 discussed above with reference to FIGS. 4 and 5. The controller logic 350 can be a set of computer-executable instructions stored in the memory that, when executed by one or more processors of the supervisory controller 300, cause the one or more processors to implement a control scheme.

Figure 6:
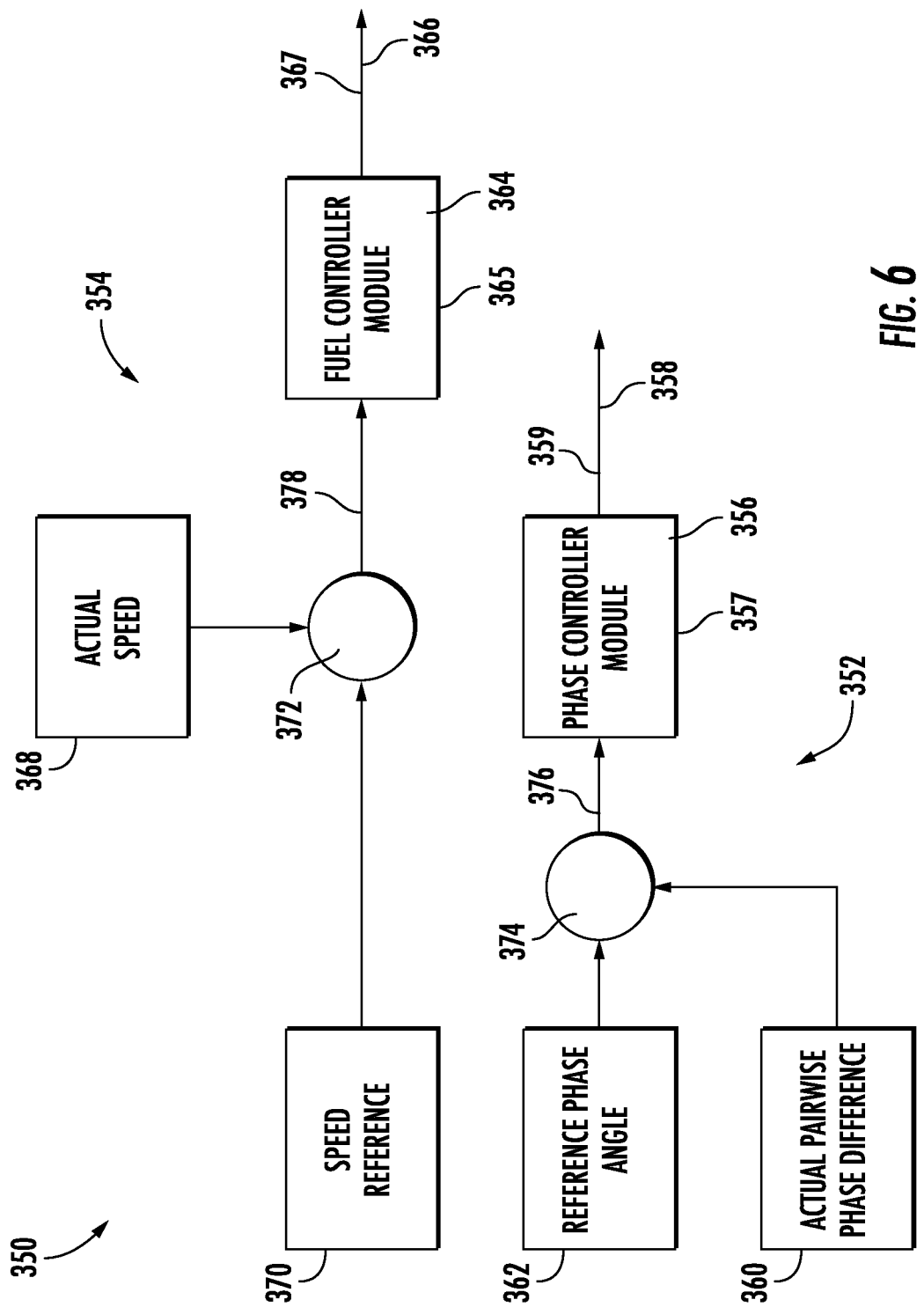
FIG. 6 illustrates a block diagram of controller logic, which may be stored within, and implemented by, the supervisory controller shown in FIGS. 4 and 5, in accordance with embodiments of the present disclosure.

Particularly, as shown in FIG. 6, the controller logic 350 may include a phase angle control scheme 352 and a speed control scheme 354. The phase angle control scheme 352 may utilize a phase control module 356 to generate a control output 358 (such as a power command for the electric machine coupled to the LP shaft) based on the difference between an actual pairwise phase difference 360 (or actual phase angle) and a reference phase angle 362 (e.g., at a summing point 374). That is, the phase control scheme 352 may generate a control output 358 based on the phase error 376 with the phase control module 356, and the control output 358 may be utilized by one or more of the controllable devices 304 for driving the phase error 376 towards (or to) zero. The speed control scheme 354 may utilize a fuel controller module 364 to generate a control output 367 (such as a fuel command for the fuel delivery system) based on the difference between an actual speed 368 and a reference speed 370 (e.g., at a summing point 372). That is, the speed control scheme may generate an output 367 based on the speed error 378 with the fuel control module 364, and the control output 367 may be utilized by one or more of the controllable devices 304 for driving the speed error 378 towards (or to) zero. The control outputs 367, 358 may be provided to the controllable devices 304 via the control signals 301, e.g., to modify or adjust an operation of the electric machines 316, the fuel delivery system 318, and/or the fan blade pitch 320 to cause the phase error 376 and/or the speed error 378 to converge towards zero.

In many embodiments, the control logic 350 may determine the actual pairwise phase difference (PPD) 360 between a pair of propulsors of the at least two propulsors (e.g., the propulsors 52 and 54 discussed above with reference to FIGS. 4 and 5) prior to providing the actual PPD 360 to the summing point 374. The actual PPD (i.e., the phase angle for a particular two propulsors) may be the difference between the angle θ of one propulsor of the at least two propulsors and the angle θ of another propulsor of the at least two propulsors at an instance in time. For example, for the embodiment shown in FIG. 5, the PPD may be the difference between the first angle $\theta_1$ and the second angle $\theta_2$ at the instance in time. In one non-limiting example, if the first angle $\theta_1$ is equal to 30° and the second angle $\theta_2$ is equal to 15°, then the actual pairwise phase difference 350 is 15° (e.g., $\theta_1$ minus $\theta_2$).

In various embodiments, the controller logic 350 may further include generating the reference phase angle (RPA) 362. The reference phase angle(s) 362 may be the desired phase angle(s) (i.e., the desired pairwise phase difference(s))

between the identified pair of propulsors. The RPA(s) 362 may be generated based on one or more gas turbine operating parameters, such as vibration, speed, or other parameters. In many implementations, the RPA(s) 362 may be equal to zero, such that after the phase shift has occurred, the phase angle or pairwise phase difference is equal to zero. Alternatively, the RPA(s) 362 may be non-zero, such that after the phase shift has occurred, the phase angle or pairwise phase difference is equal to the non-zero value.

In propulsion systems having only two propulsors, such as the embodiment shown in FIG. 5, the supervisory controller 300 may generate only one reference phase angle RPA 12 between the first propulsor 52 and the second propulsor 54. However, for propulsion systems having more than two propulsors, the supervisory controller 300 may generate a plurality of RPAs all relative to the same reference propulsor. For example, taking the first propulsor as the reference propulsor, the supervisory controller 300 may generate: a first $RPA_{12}$ between the first propulsor 52 and the second propulsor 54; a second $RPA_{13}$ between the first propulsor 52 and a third propulsor (not shown); and/or a third $RPA_{14}$ between the first propulsor 52 and a fourth propulsor (not shown).

Referring back to FIG. 6, the phase angle control scheme 352 may further include comparing, at the summing point 374, the actual pairwise phase difference 360 to the reference phase angle 362 to generate a phase error 376. The phase error 376 may be the difference between the actual pairwise phase difference 360 and the reference phase angle 362, which may be calculated at the summing point 374. For example, if the PPD 360 is 15° and the RPA 362 is 7°, then the phase error 376 is 8° (e.g., 15° minus 7°). In many implementations, the controller logic 350 may further include providing the phase error 376 to the phase controller module 356 to generate an output 358 based on the phase error 376. In exemplary embodiments, the controller logic 350 may adjust a speed (e.g., a rotational speed of the HP shaft 122 and/or the LP shaft 124) of at least one propulsor of the at least two propulsors based on the output 358, in order to drive the phase error 376 towards (or to) zero. That is, when the actual pairwise phase difference converges towards the reference phase angle, the phase error 376 may converge towards zero. For example, if the PPD 360 is initially 15° and the RPA 362 is 7°, then the phase error 376 is 8° (e.g., 15° minus 7°). Subsequently, after beginning the speed adjustment, if the PPD 360 is 13° and the RPA 362 is still 7°, then the phase error 376 is 6°. Subsequently, after continuing the speed adjustment, if the PPD 360 is 8° and the RPA 362 is still 7°, then the phase error 376 is 1°. In this way, adjusting the speed may drive the phase error 376 towards zero.

In many embodiments, as shown in FIG. 6, in implementing the speed control scheme 354, the controller logic 354 may further include generating a speed reference 370 for one or more propulsors of the at least two propulsors (e.g., one or more of the first propulsor 52 and/or the second propulsor 54). The speed reference 370 may be the desired speed of the one or more propulsors (such as the desired rotational speed of the HP shaft 122 and/or the LP shaft 124 of the one or more propulsors). The speed reference 370 may be generated based on one or more operating parameters of the propulsors (such as one or more temperatures, pressures, vibrations, or other operating parameters of the propulsors) or in response to an operator input (such as the pilot adjusting the throttle of the aircraft 10). That is, if the pilot increases the throttle angle, then the reference speed may increase, and vice versa. Additionally, the controller logic 350 may include receiving the actual speed of the one or more propulsors of the at least two propulsors. The actual speed 368 may be the rotational speed of the one or more propulsors of the at least two propulsors (such as the rotational speed of the LP shaft 124 or HP shaft 122 of the propulsors 52, 54). The actual speed 368 may be sensed (e.g., via one or more sensors) or estimated (e.g., by the supervisory controller 300 based on other operating parameters of the propulsors 52, 54). In many implementations, the speed control scheme 354 may further include comparing, at the summing point 372, the actual speed 368 to the reference speed 370 to generate a speed error 378. The speed error 378 may be the difference between the reference speed 370 and the actual speed 368. For example, if the reference speed is 3000 RPM, and the actual speed is 2500 RPM, then the speed error 378 may be 500 RPM. In such embodiments, the speed control scheme 354 may further include providing the speed error 378 to a fuel controller module 364 to generate a fuel command 366 as the output 367 based on the speed error 378. The fuel command 366 may be an operational setpoint for the fuel delivery system 151, such that when the fuel delivery system 151 receives the fuel command 366, the fuel delivery system adjusts an amount of fuel provided to the combustion section 114 of the propulsor(s) 52, 54 to be in accordance with the fuel command 366. For example, the controller logic 350 may adjust an amount of fuel supplied to the combustion section 114 of the one or more propulsors of the at least two propulsors (e.g., the propulsors 52, 54) with the fuel delivery system 151 based on the fuel command, thereby adjusting the speed of the one or more propulsors to drive the speed error towards (or to) zero.

The phase controller module 356 may be a phase Proportional-Integral-Derivative (PID) controller 357 configured to regulate the actual pairwise phase difference 360. The phase PID controller 357 may be used to regulate a process variable (e.g., the actual pairwise phase difference 360 between a pair of propulsors 52, 54) in response to measured deviations from a desired setpoint (e.g., the reference phase angle 362) by adjusting a control variable (e.g., the output 358, which may be an electric machine power command 359 or a reference speed modifier 380).

For example, the phase controller module 356 may be used for regulating the actual pairwise phase difference 360 in response to deviations from the reference phase angle 362 (i.e., based on the phase error 376) by adjusting the output 358. In some embodiments, based on the phase error 376 (e.g., based on the magnitude and/or rate of change of the phase error 376), the phase controller module 356 may generate or adjust an electric machine power command 359 as the output 358. The electric machine power command 359 may be a power transfer setpoint, and the electric machine power command 359 may be provided to one or more electric machines 316 to adjust an amount of power supplied to, or removed from, the shaft to which the electric machine 316 is attached (e.g., the LP shaft 124 and/or the HP shaft 122). As a result, rotational speed of the LP shaft 124 and/or the HP shaft 122 may be adjusted, which drives the phase error 376 towards zero. For example, this adjustment drives the actual pairwise phase difference 360 towards the reference phase angle 362 (thereby minimizing or eliminating the phase error 376).

Particularly, in exemplary embodiments, the electric machine power command 359 may be provided to one or both of the electric machines 56A-2 and/or 56B-2 coupled to the LP shafts 122 of the first and/or second propulsors 52, 54 (shown in FIG. 5), thereby adjusting the amount of power transferred between the electric machines 56A-2, 56B-2 and the respective LP shaft 122, which causes the actual pairwise phase difference 360 between the propulsors 52, 54 to converge towards the reference phase angle 362 (i.e., causes the phase error to converge towards zero).

Similarly, the fuel controller module 364 may be a speed Proportional-Integral-Derivative (PID) controller 365 configured to regulate the actual speed 368 of one or more propulsors of the at least two propulsors. The speed PID controller 3365 may be used to regulate a process variable (e.g., the actual speed 368 of one or more of the propulsors 52, 54) in response to measured deviations from a desired setpoint (e.g., the reference speed 370) by adjusting a control variable (e.g., the fuel command 366).

For example, the fuel controller module 364 may be used for regulating the actual speed 368 of one or more of the propulsors (e.g., the rotational speed of the LP shaft 124 and/or the HP shaft 122) in response to deviations from the speed reference 370 (i.e., based on the speed error 378). That is, based on the speed error 378 (e.g., based on the magnitude and/or rate of change of the speed error 378), the fuel controller module 364 may generate or adjust the fuel command 366 as an output, which may be provided to the fuel delivery system to adjust (e.g., increase or decrease) the amount of fuel supplied to the combustion section, thereby adjusting the speed of the propulsor(s), which drives actual speed 368 towards the speed reference 370 (i.e., drives the speed error towards or to zero). For example, if the speed error is 500 RPM (e.g., the actual speed is 2500 RPM and the reference speed is 3000 RPM), then the fuel controller module 365 may determine that an increased amount of fuel needs to be supplied to the combustions section, in order to increase the actual speed, thereby driving the speed error towards zero.

The PID controllers discussed above (e.g., the phase PID controller 357 and the speed PID controller 365) may each use three terms to adjust the respective control variables: the proportional term (P), the integral term (I), and the derivative term (D). The proportional term is proportional to the error (e.g., the phase error or the speed error) between the process variable (e.g., the actual pairwise phase difference or the actual speed) and the setpoint (e.g., the reference phase angle or the speed reference). It causes the controller to respond proportionally to the error. The integral term is proportional to the accumulation of past errors over time (i.e., the area under the curve). It helps to eliminate steady-state errors, which can occur when there is a constant, small deviation from the setpoint. The integral term slowly adjusts the control variable until the steady-state error is eliminated. The derivative term is proportional to the rate of change of the error over time. It helps to anticipate future changes in the process variable and respond accordingly. It helps the PID controller to respond quickly to changes in the setpoint and prevent overshooting. The three terms are combined by summing them together to determine the overall response of the system. The proportional term provides an immediate response to the current error, the integral term eliminates steady-state errors, and the derivative term helps to anticipate and respond to future changes in the error. The PID controller continuously monitors the process variable and calculates the error, which is then fed into the PID algorithm. The algorithm calculates the appropriate control variable output based on the three terms, and this output is then used to adjust the process variable towards the setpoint.

Figure 7:
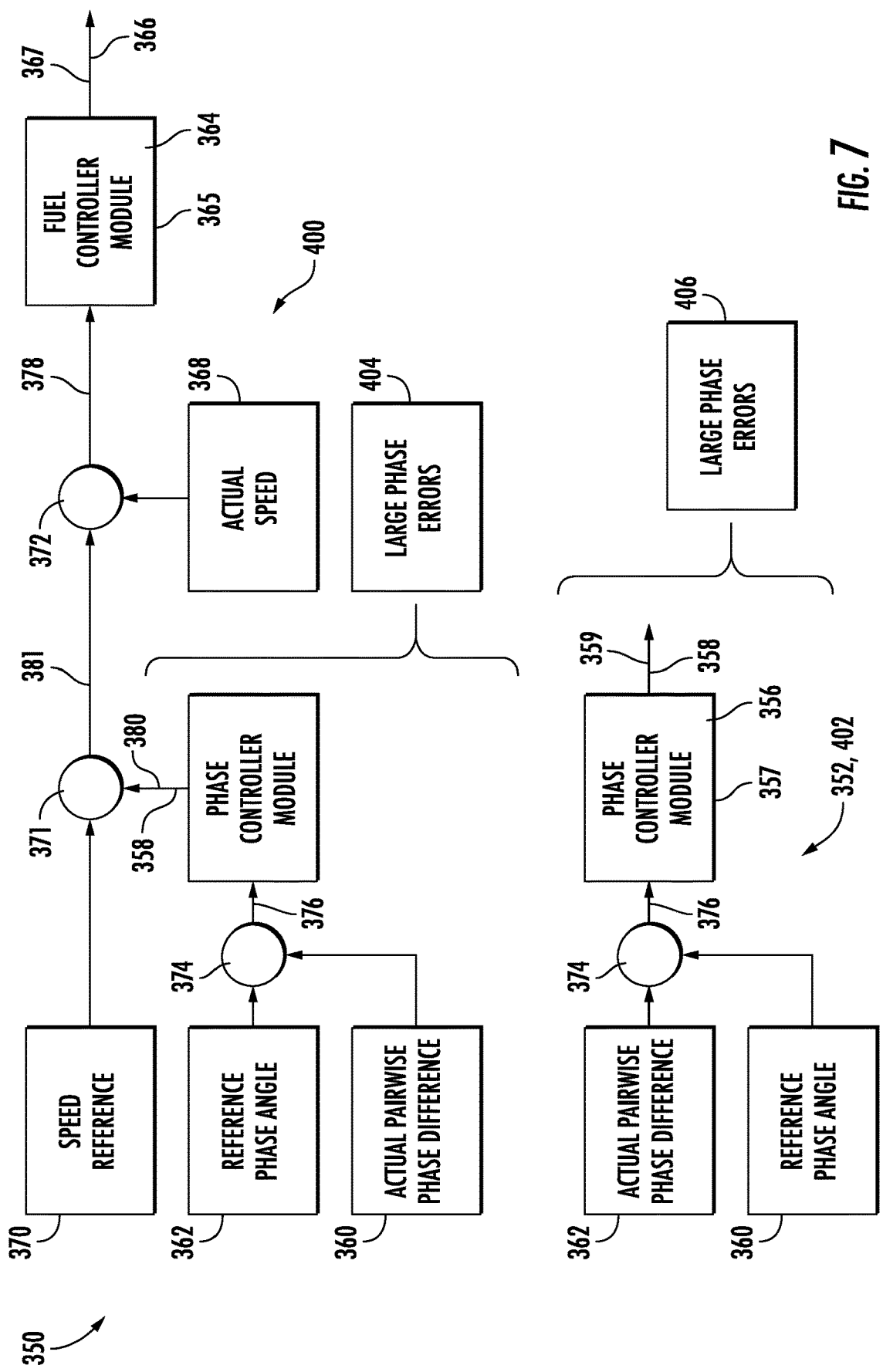
FIG. 7 illustrates a block diagram of controller logic, which may be stored within, and implemented by, the supervisory controller shown in FIGS. 4 and 5, in accordance with embodiments of the present disclosure.

Referring now specifically to FIG. 7, in some embodiments, the controller logic 350 may include a large error control scheme 400 and a small error control scheme 402. The small error control scheme 402 may be the same as the phase angle control scheme 352 discussed above with reference to FIG. 6. In general, the controller logic 350 may implement the large error control scheme 400 when the phase error 376 is large, and the controller logic 350 may implement the small error control scheme 402 when the phase error 376 is small. Particularly, the controller logic 350 may determine whether the phase error 376 is less than or exceeds an error threshold. When the phase error 376 exceeds the phase error threshold, the phase error 376 is considered a large phase error 404, and the controller logic 350 may implement the large error control scheme 400. By contrast, when the phase error 376 is less than the phase error threshold, the phase error 376 is considered a small phase error 406, and the controller logic 350 may implement the small error control scheme 402.

More specifically, when the phase error 376 is determined to be less than the error threshold, the small error control scheme 402 may be implemented, and only an electric machine power command 359 may be generated as the output 358 of the phase controller module 356. In such implementations, the speed of at least one propulsor of the at least two propulsors may be adjusted based on the output (e.g., by transferring power between the electric machines and the shaft of the propulsors).

Alternatively, when the phase error 376 is determined to exceed the error threshold, then the large error control scheme 400 may be implemented, and only a speed reference modifier 380 for the one or more propulsors of the at least two propulsors may be generated as the output 358 of the phase controller module 356. Particularly, when the large error control scheme 400 is implemented, based on the phase error 376 (e.g., based on the magnitude and/or rate of change of the phase error 376), the phase controller module 356 may generate the speed reference modifier 380 as the output 358, which may be utilized for modifying the speed reference 370 (at the summing point 371) prior to the comparison between the actual speed 368 and the speed reference 370 (at the summing point 372), thereby impacting the output of the fuel controller module 364. That is, the summing point 371 may output a modified speed reference 381, which may be compared to the actual speed 368 to produce the speed error 378. In this way, the phase controller module 356 may drive the actual pairwise phase difference 360 towards (or to) the reference phase angle 362 by modifying the speed reference 370 by the speed reference modifier 380, which is based on the phase error 376 (e.g., based on the magnitude and/or rate of change of the phase error 376).

Figure 8:
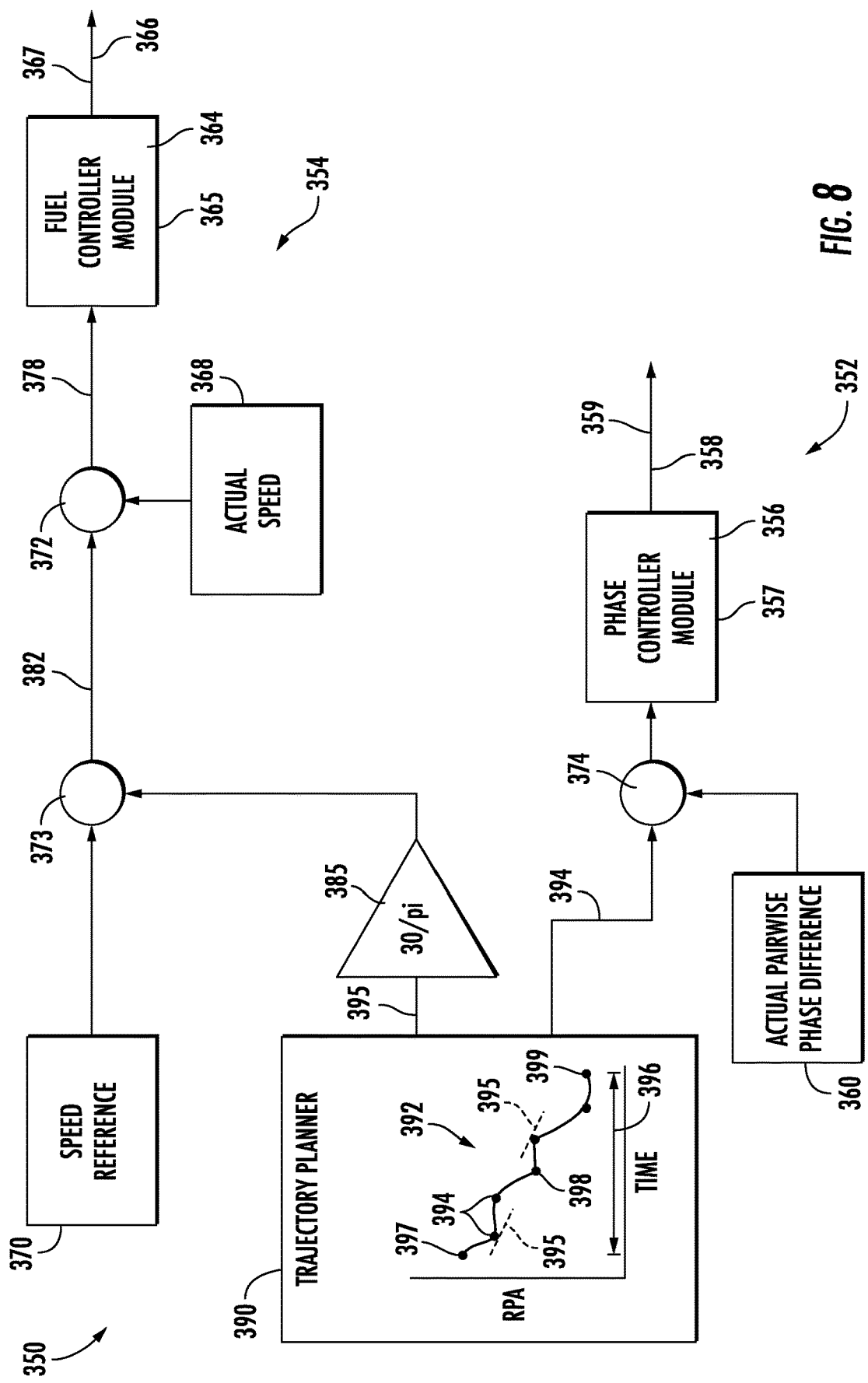
FIG. 8 illustrates a block diagram of controller logic, which may be stored within, and implemented by, the supervisory controller shown in FIGS. 4 and 5, in accordance with embodiments of the present disclosure.
Figure 9:
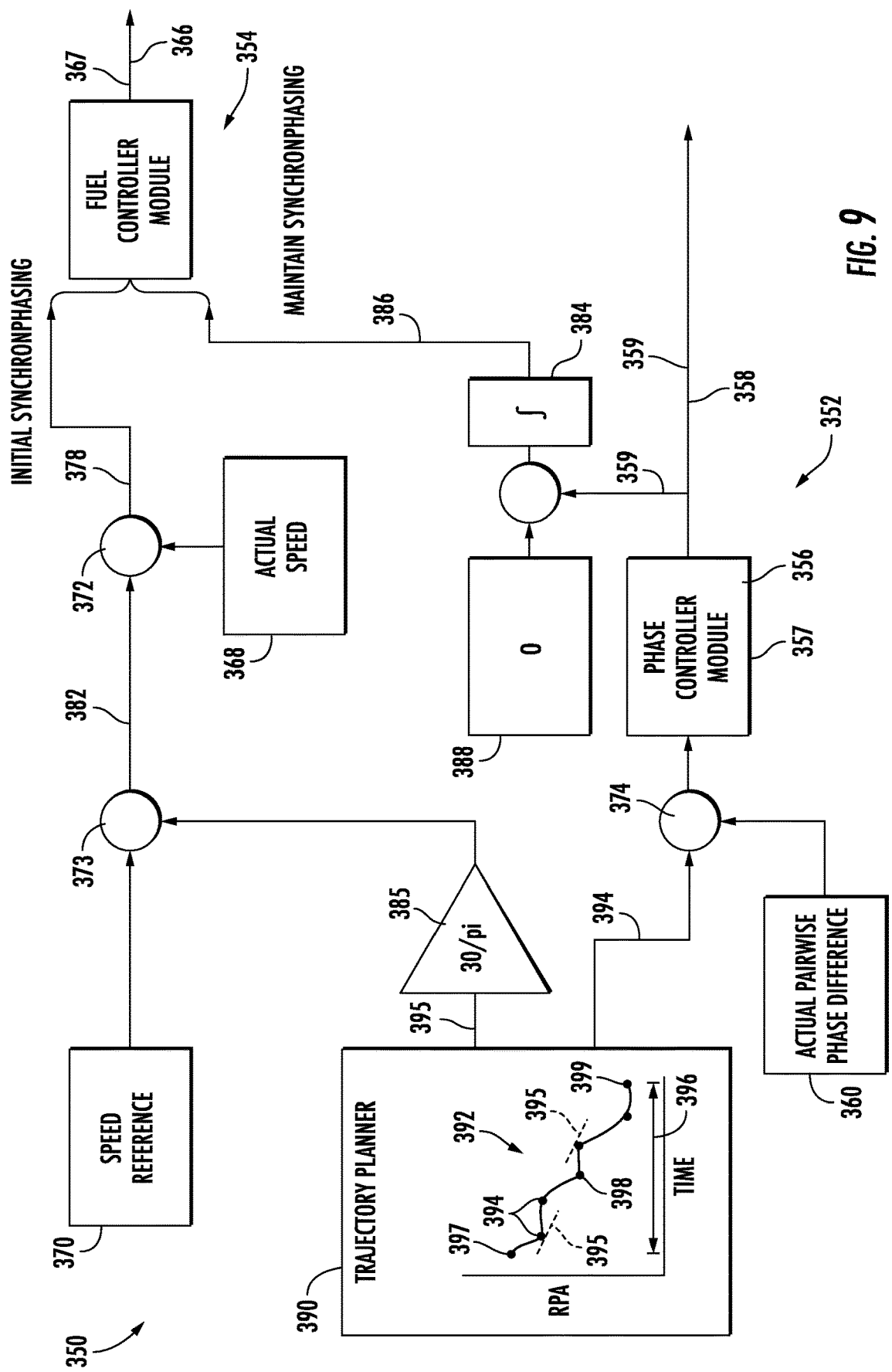
FIG. 9 illustrates a block diagram of controller logic, which may be stored within, and implemented by, the supervisory controller shown in FIGS. 4 and 5, in accordance with embodiments of the present disclosure.

Referring now to FIGS. 8 and 9, each of which illustrate controller logic 350 having the phase angle control scheme 352 and the speed control scheme 354. The phase angle control scheme 352 may utilize the phase control module 356 to generate a control output 358 (such as the electric the electric machine power command for the electric machine coupled to the LP shaft) based on the difference between an actual pairwise phase difference 360 (or actual phase angle) and a reference phase angle 362 (e.g., at a summing point 374). The speed control scheme 354 may utilize a fuel controller module 364 to generate a control output 367 (such as a fuel command for the fuel delivery system) based on the difference between an actual speed 368 and a reference speed 370 (e.g., at a summing point 372). The control outputs 367, 358 may be provided to the controllable devices 304 via the control signals 301, e.g., to modify or adjust an operation of the electric machines 316, the fuel delivery system 318, and/or the fan blade pitch 320.

The controller logic 350 may further include providing, via a trajectory planner 390, a reference phase angle trajectory 392 to the phase angle control scheme 352 over a time period 396. The reference phase angle trajectory 392 includes a plurality of reference phase angle setpoints 394 each at a respective time within the time period 396. In many embodiments, the controller logic 350 may provide the plurality of reference phase angle setpoints 394 to the phase controller module 356 over the time period 396. The trajectory planner 390 may generate the phase angle reference (RPA) trajectory 392, including the plurality of phase angle reference setpoints 394, and provided them to the phase angle control scheme 352 over the time period 396.

The plurality of RPA setpoints 394 may include an initial RPA setpoint 397 at the beginning of the time period 396, a final RPA setpoint 399 at the end of the time period 396, and one or more intermediate RPA setpoints 398 each at a respective instance in time within the time period between the initial RPA setpoint 387 and the final RPA setpoint 399. The trajectory planner 390 may provide the plurality of RPA setpoints 394 to the phase angle control scheme 352, starting with the initial RPA setpoint 397, over the time period 396, thereby generating an output 358 for each setpoint 394 in order to drive the actual pairwise phase difference 360 towards (or to) each of the RPA setpoints 394 over the time period 396. In this way, the actual pairwise phase difference 360 is eventually driven to the final RPA setpoint 399 at the end of the time period 396.

Additionally, in many embodiments, the controller logic 350 may further include providing a derivative of the reference phase angle trajectory 392 to the speed control scheme 354 to modify the speed reference 370 prior to the comparison between the speed reference 370 and the actual speed 368 (e.g., at the summing point 372). The derivative of the reference phase angle trajectory 392 may be equivalent to a rotational speed (e.g., a change in the reference phase angle over time), such that the derivative may be advantageously used for modifying the speed reference 370.

That is, the controller logic 350 may generate a derivative of the reference phase angle trajectory 392, and the controller logic 350 may modify the speed reference 370 by the derivative of the reference phase angle trajectory 392 prior to comparing the actual speed 368 to the reference speed 370 to generate the speed error 378. Specifically, the controller logic 350 may generate, for each reference phase angle setpoint of the plurality of reference phase angle setpoints 394, a rate of change 395, which may be used for modifying the speed reference 370 (e.g., at the summing point 373) prior to comparing the actual speed 368 to the reference speed to generate the speed error 378. More specifically, a modified speed reference 382 and the actual speed 368 may be provided to the summing point 372 to generate the speed error 378. In this way, the rate of change 395 of the reference phase angle trajectory 392 may influence the output of the fuel controller module (e.g., the fuel command) in order to more accurately drive the actual speed 368 to the reference speed 370. In some embodiments, the rate of change 395 (i.e., the derivative of the reference phase angle trajectory 392) may first be provided to a multiplier 385 prior to the summing point 373. The multiplier 385 may multiply the rate of change 395 by a constant. In this way, the rate of change 395 may be scaled (by the multiplier 385) prior to be provided to the summing point 373. For example, if the rate of change 395 of the phase angle trajectory is 15° per second, and the multiplier is 2, then the scaled rate of change 395 may be 30° per second.

Referring specifically to FIG. 9, in many embodiments, the controller logic 350 may further include providing, via an integrator 384, an integral 386 of the electric machine power command 359 to the fuel controller module 364 to generate the fuel command 366 based on the integral 386 of the electric machine power command 359. More specifically, once a phase error 376 and/or a speed error 378 is initially detected or determined (i.e., the one or more propulsors are in need of synchrophasing), the fuel controller module 364 may generate the fuel command 366 based on (e.g., solely) the speed error 378, and the phase controller module 356 may generate the electric machine power command 359 based on (e.g., solely) the phase error 376. However, once synchrophasing is approximately achieved (i.e., the phase error 376 and/or the speed error 378 are each driven near zero, such as within 20% of zero, or such as within 15% of zero, or such as within 10% of zero, or such as within 5% of zero, or such as within 1% of zero), the controller logic 350 may stop providing the speed error 376 to the fuel controller module 364, such that the fuel command 366 is no longer generated based on the speed error 376. Subsequently, the controller logic 350 may provide the integral 386 of the electric machine power command 359 to the fuel controller module 364 to generate the fuel command 366 based on the integral 386 of the electric machine power command 359 to maintain the synchrophasing (i.e., maintain the phase error 376 and/or the speed error 378 near zero).

In many embodiments, the controller logic may include determining when phase error is within a predetermined range (e.g., a predetermined range of zero, such as within such as within 15% of zero, or such as within 10% of zero, or such as within 5% of zero, or such as within 1% of zero. Once the phase error is within the predetermined range, the controller logic 350 may stop providing the speed error 376 to the fuel controller module 364, such that the fuel command 366 is no longer generated based on the speed error 376. Subsequently, the controller logic 350 may provide the integral 386 of the electric machine power command 359 to the fuel controller module 364 to generate the fuel command 366 based on the integral 386 of the electric machine power command 359 in order to aid in maintaining the electric machine power command 359 within the predetermined range of zero, which also advantageously maintains the synchrophasing (i.e., maintain the phase error 376 and/or the speed error 378 near zero).

In various embodiments, the controller logic 350 may include determining when the integral 386 of the electric machine power command 359 is within a predetermined range of zero (as shown by the zero setpoint 388 in FIG. 9), such as within such as within 15% of zero, or such as within 10% of zero, or such as within 5% of zero, or such as within 1% of zero. Once the electric machine power command 359 is within the predetermine range of zero (or at zero), the controller logic 350 may stop providing the speed error 376 to the fuel controller module 364, such that the fuel command 366 is no longer generated based on the speed error 376. Subsequently, the controller logic 350 may provide the integral 386 of the electric machine power command 359 to the fuel controller module 364 to generate the fuel command 366 based on the integral 386 of the electric machine power command 359 in order to aid in maintaining the electric machine power command 359 within the predetermined range of zero, which also advantageously maintains the synchrophasing (i.e., maintain the phase error 376 and/or the speed error 378 near zero).

Figure 10:
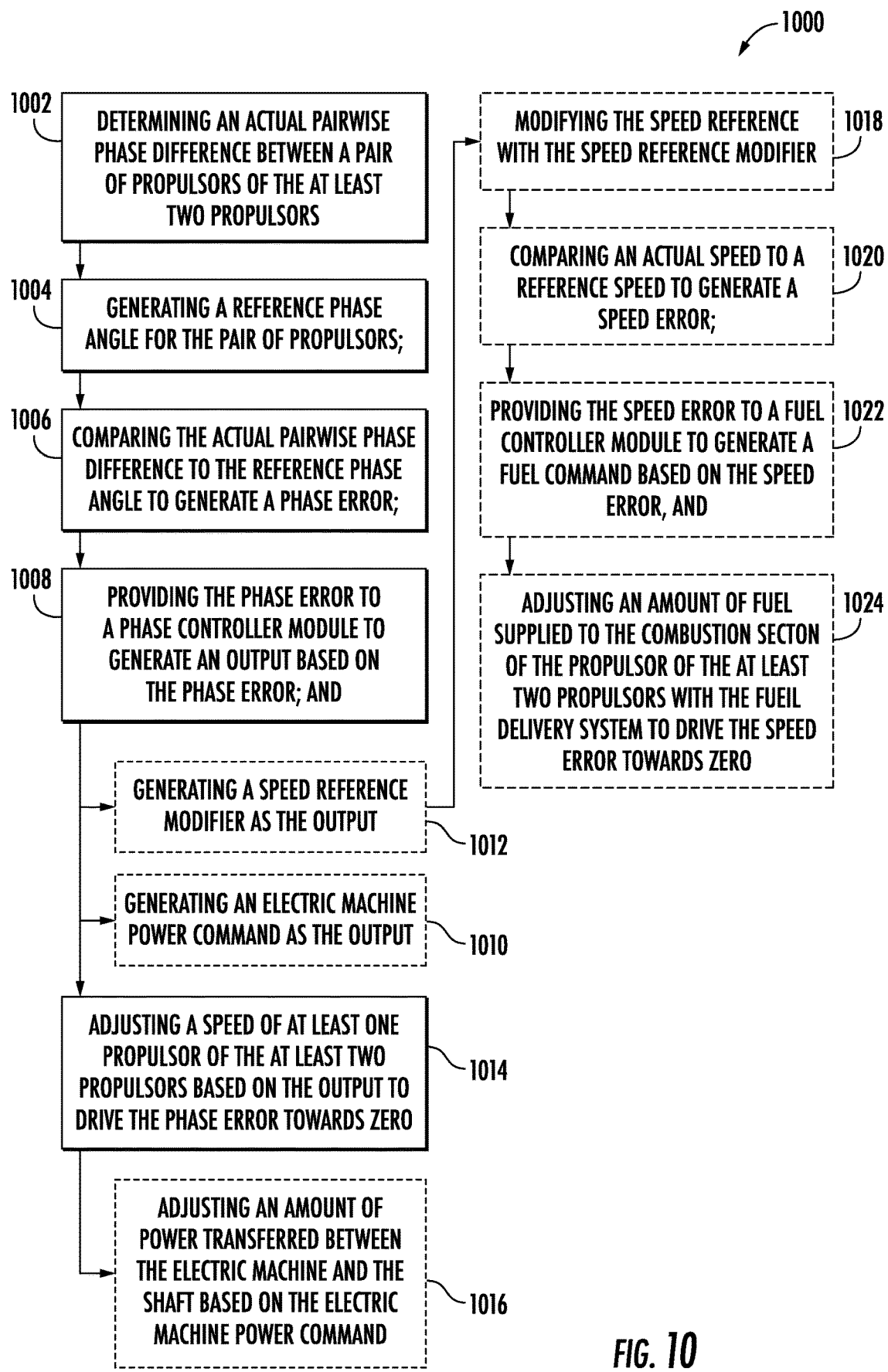
FIG. 10 is a flow chart of a method of operating a propulsion system in accordance with embodiments of the present disclosure.

Referring now to FIG. 7, a flow diagram of one embodiment of a method 1000 of operating a propulsion system is illustrated in accordance with embodiments of the present subject matter. In general, the method 1000 will be described herein with reference to the propulsion system 50, the propulsors 52, 54, the aircraft 10, gas turbine engine 100, the supervisory controller 300, and the control logic 350 described above with reference to FIGS. 1-9. However, it will be appreciated by those of ordinary skill in the art that the disclosed method 1000 may generally be utilized with any suitable turbomachine and/or may be utilized in connection with a system having any other suitable system configuration. In addition, although FIG. 10 depicts steps performed in a particular order for purposes of illustration and discussion, the methods discussed herein are not limited to any particular order or arrangement unless otherwise specified in the claims. One skilled in the art, using the disclosures provided herein, will appreciate that various steps of the methods disclosed herein can be omitted, rearranged, combined, and/or adapted in various ways without deviating from the scope of the present disclosure. The dashed boxes may indicate optional steps of the method 1000.

The propulsion system according to the method 1000 may include at least two propulsors. The at least two propulsors each may each include a fan. The propulsion system of the method 1000 may include at (1002) determining an actual pairwise phase difference between a pair of propulsors of the at least two propulsors. The actual pairwise phase difference (i.e., the phase angle for the pair of propulsors) may be the difference between the angle θ of one propulsor of the at least two propulsors and the angle θ of another propulsor of the at least two propulsors at an instance in time. For example, at a particular instance in time (i.e., a moment in time), the supervisory controller may determine or receive (e.g., by measuring, sensing, or estimating) angles between a reference line and a propeller blade of each of the fans closest to the reference line, and these angles may then be compared (e.g., by taking an absolute value of the difference) to one another to determine the pairwise phase difference.

In a propulsion system or aircraft having more than two propulsors, the method 1000 may include generating a plurality of pairs of propulsors all relative to the same reference propulsor (e.g., a first pair between propulsor one and propulsor two, a second pair between propulsor one and propulsor three, a third pair between propulsor one and propulsor four, etc.). Subsequently, the method 1000 may include generating a pairwise phase difference for each pair of propulsors.

In exemplary implementations, the method 1000 may further include at (1004) generating a reference phase angle for the pair of propulsors. For example, a reference phase angle may be a desired or target pairwise phase difference between the given pair of propulsors. The reference phase angle may be generated based on operating conditions of the propulsors. In various implementations, the method 1000 may further include (1006) comparing the actual pairwise phase difference to the reference phase angle to generate a phase error, and at (1008) providing the phase error to a phase controller module to generate an output based on the phase error. In some implementations, the method 1000 may include at (1010) generating an electric machine power command as the output. In other implementations, the method 1000 may include at (1012) generating a speed reference modifier as the output.

The method 1000 may further include at (1014) adjusting a speed of at least one propulsor of the at least two propulsors based on the output to drive the phase error towards zero. In some implementations, adjusting the speed at (1014) may include at (1016) adjusting an amount of power transferred between the electric machine and the shaft based on the electric machine power command.

In many implementations, the method may include generating a speed reference for one or more propulsors of the at least two propulsors, and the method may include receiving an actual speed of the propulsor of the at least two propulsors. In such implementations, the method 1000 may include at (1020) comparing the actual speed to the reference speed to generate a speed error. In some implementations, the speed reference may be directly compared (e.g., added or subtracted) to the actual speed to determine the speed error. In other implementations, the method 1000 may include at (1018) modifying the speed reference with the speed reference modifier prior to comparing the actual speed to the reference speed to generate the speed error.

In many implementations, the method 1000 may include at (1022) providing the speed error to a fuel controller module to generate a fuel command based on the speed error. In such implementations, the method 1000 may include at (1024) adjusting an amount of fuel supplied to the combustion section of the propulsor of the at least two propulsors with the fuel delivery system to drive the speed error towards zero. For example, if the speed error is 500 RPM (e.g., the actual speed is 2500 RPM and the reference speed is 3000 RPM), then the fuel controller module 365 may generate a fuel command to supply an increased amount of fuel to the combustions section, in order to increase the actual speed, which causes the actual speed to converge towards the reference speed, thereby driving the speed error towards zero.

Figure 11:
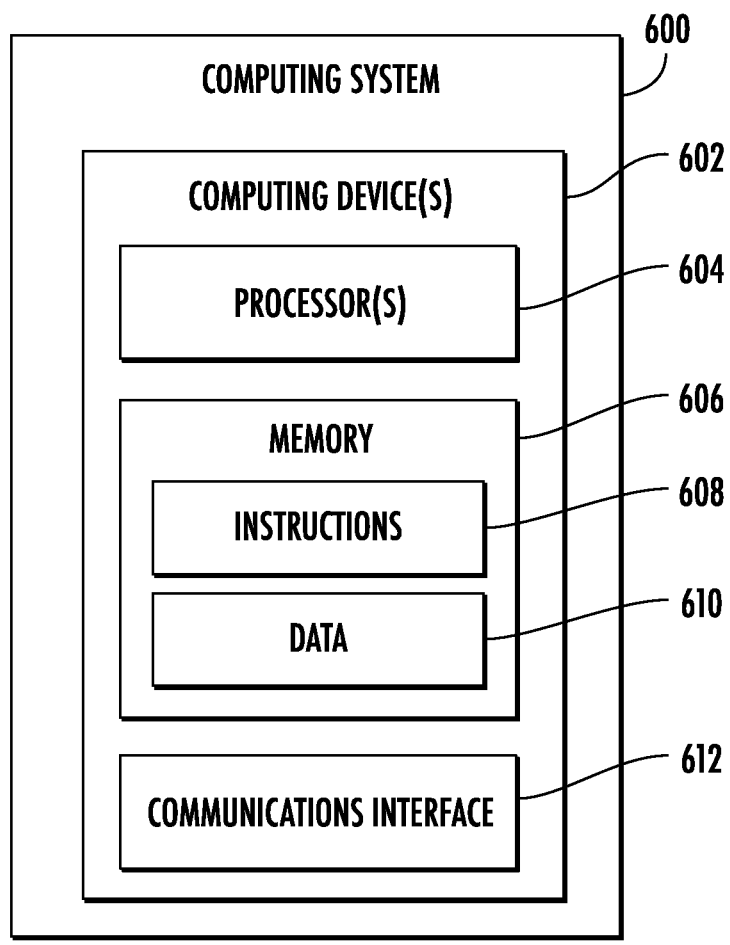
FIG. 11 provides a block diagram of a computing system for implementing one or more aspects of the present disclosure according to example embodiments of the present disclosure.

FIG. 11 provides a block diagram of an example computing system 600. The computing system 600 can be used to implement the aspects disclosed herein. The computing system 600 can include one or more computing device(s) 602. The controller 72, the first gas turbine engine controller 156, the second gas turbine engine controller 158, the supervisory controller 300, and/or the fuel controller disclosed herein can be constructed and may operate in a same or similar manner as one of the computing devices 602, for example.

As shown in FIG. 8, the one or more computing device(s) 602 can each include one or more processor(s) 604 and one or more memory device(s) 606. The one or more processor(s) 604 can include any suitable processing device, such as a microprocessor, microcontroller, integrated circuit, logic device, or other suitable processing device. The one or more memory device(s) 606 can include one or more computer-readable media, including, but not limited to, non-transitory computer-readable medium or media, RAM, ROM, hard drives, flash drives, and other memory devices, such as one or more buffer devices.

The one or more memory device(s) 606 can store information accessible by the one or more processor(s) 604, including computer-readable or computer-executable instructions 608 that can be executed by the one or more processor(s) 604. The instructions 608 can be any set of instructions or control logic that when executed by the one or more processor(s) 604, cause the one or more processor(s) 604 to perform operations. The instructions 608 can be software written in any suitable programming language or can be implemented in hardware. In some embodiments, the instructions 608 can be executed by the one or more processor(s) 604 to cause the one or more processor(s) 604 to perform operations.

The memory device(s) 606 can further store data 610 that can be accessed by the processor(s) 604. For example, the data 610 can include sensor data such as engine parameters, model data, logic data, etc., as described herein. The data 610 can include one or more table(s), function(s), algorithm(s), model(s), equation(s), etc. according to example embodiments of the present disclosure.

The one or more computing device(s) 602 can also include a communication interface 612 used to communicate, for example, with the other components of the aircraft. The communication interface 612 can include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. It will be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems.

Figure 12:
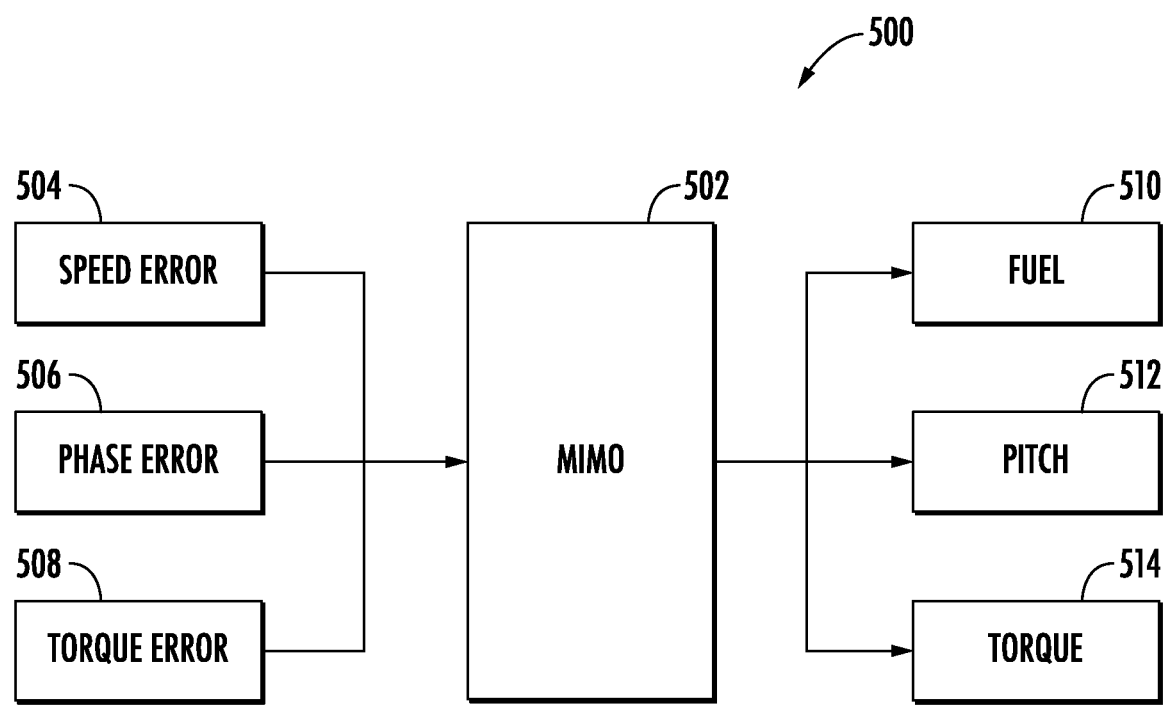
FIG. 12 illustrates a block diagram of a multi-input multi-output (MIMO) control module, which may be stored within, and implemented by, the supervisory controller shown in FIGS. 4 and 5, in accordance with embodiments of the present disclosure.

Referring now to FIG. 12, a block diagram of a multi-input multi-output (MIMO) control logic 500, which may be stored within, and implemented by, the supervisory controller 300 shown in FIGS. 4 and 5, in accordance with embodiments of the present disclosure. As shown, the MIMO control logic 500 may include a MIMO control module 502. The MIMO control module 502 may utilize mathematical algorithms to analyze multiple input signals and generate control signals for the outputs. These algorithms can be based on different control strategies such as PID (Proportional Integral Derivative), LQR (Linear Quadratic Regulator), or MPC (Model Predictive Control). The MIMO control module 502 may account for the interactions between the inputs and outputs, which means that changing one input will affect not only the corresponding output but also the other outputs. This can be represented using a mathematical model of the system, such as a transfer function or a state-space model.

In many embodiments, the supervisory controller 300 may determine a speed error 504, a phase error 506, and a torque error 508. For example, the controller 300 may compare an actual speed (e.g., a rotational speed of the HP shaft and/or the LP shaft) to a reference speed to generate the speed error 504. Additionally, the controller 300 may compare the actual pairwise phase difference to a reference phase angle to generate the phase error 506. Further, the controller 300 may compare an actual torque (e.g., a torque of the HP shaft and/or the LP shaft) to a reference torque to generate a torque error. The speed error 504, the phase error 506, and the torque error 508 may be provided to the MIMO control module.

In exemplary implementations, the MIMO control module 502 may generate a fuel command 510, a pitch command 512, and a torque command 514 with the MIMO control module 502 at least partially based on the speed error 504, the phase error 506, and the torque error 508. Notably, the MIMO control module 502 may account for the interactions between the inputs and outputs, which means that changing one input will affect not only the corresponding output but also the other outputs (e.g., an adjustment to any one of the speed error 504, the phase error 506, and the torque error 508 may result in an adjustment to all of the fuel command 510, the pitch command 512, and the torque command 514).

Subsequently, the gas turbine engine may perform one or more control actions at least partially based on the generated fuel command 510, pitch command 512, and torque command 514. For example, the fuel command 510 may be provided to the fuel delivery system to adjust (e.g., increase or decrease) the amount of fuel supplied to the combustion section, thereby adjusting the speed of the propulsor(s). The pitch command 512 may be provided to the controller 300 for adjustment of the pitch P of the fan blades 128 via the actuator 132. The torque command 514 may be provided to at least one of the electric machines 56-1, 56-2 to adjust an amount of torque applied (i.e., power transferred) from the electric machines 56-1, 56-2 to the LP shaft and/or HP shaft.

Although specific features of various embodiments may be shown in some drawings and not in others, this is for convenience only. In accordance with the principles of the present disclosure, any feature of a drawing may be referenced and/or claimed in combination with any feature of any other drawing.

The present disclosure provides various control methods for synchrophasing two or more propulsors by utilizing an electric machine and/or a fuel delivery system of the two or more propulsors. Particularly, the various control methods advantageously utilize a phase control module for generating an output based on a phase error, which is provided to the electric machine and/or the fuel delivery system to drive the phase error to zero. Similarly, the various control methods advantageously utilize a fuel control module for generating a fuel command based on a speed error, which is provided to the fuel delivery system for driving the speed error towards zero.

Further aspects are provided by the subject matter of the following clauses:

A propulsion system comprising: at least two propulsors, each of the at least two propulsors comprising a fan; and a controller having one or more processors configured to implement controller logic, in implementing the controller logic, the one or more processors are configured to: determine an actual pairwise phase difference between a pair of propulsors of the at least two propulsors; generate a reference phase angle for the pair of propulsors; compare the actual pairwise phase difference to the reference phase angle to generate a phase error; provide the phase error to a phase controller module to generate an output based on the phase error; and adjust a speed of at least one propulsor of the at least two propulsors based on the output to drive the phase error towards zero.

The propulsion system of any preceding clause, wherein each propulsor of the at least two propulsors further comprises a shaft coupled to the fan and an electric machine operably connected to the shaft, and wherein the one or more processors, in implementing a phase angle control scheme, are configured to: provide the phase error to the phase controller module to generate the output as an electric machine power command that is based on the phase error; and adjust an amount of power transferred between the electric machine and the shaft based on the electric machine power command.

The propulsion system of any preceding clause, wherein each propulsor of the at least two propulsors further comprises a fuel delivery system operably connected to a combustion section, wherein the one or more processors, in implementing a speed control scheme, are further configured to: generate a speed reference for one or more propulsors of the at least two propulsors; receive an actual speed of the propulsor of the at least two propulsors; compare the actual speed to the reference speed to generate a speed error;

provide the speed error to a fuel controller module to generate a fuel command based on the speed error; and adjust an amount of fuel supplied to the combustion section of the one or more propulsors of the at least two propulsors with the fuel delivery system to drive the speed error towards zero.

The propulsion system of any preceding clause, wherein the one or more processors are further configured to: generate, with the phase controller module, a speed reference modifier for the one or more propulsors of the at least two propulsors based on the phase error as the output; and modify the speed reference with the speed reference modifier prior to comparing the actual speed to the speed reference to generate the speed error.

The propulsion system of any preceding clause, wherein the one or more processors are further configured to: determine whether the phase error is less than or exceeds an error threshold; generate, when the phase error is determined to be less than an error threshold, only an electric machine power command as the output based on the phase error; adjust a speed of at least one propulsor of the at least two propulsors based on the output.

The propulsion system of any preceding clause, wherein the one or more processors are further configured to: determine whether the phase error is less than or exceeds an error threshold; generate, when the phase error is determined to exceed an error threshold, only a speed reference modifier for the propulsor of the at least two propulsors based on the phase error as the output; and adjust a speed of at least one propulsor of the at least two propulsors based on the output.

The propulsion system of any preceding clause, wherein the one or more processors are further configured to: provide, via a trajectory planner, a reference phase angle trajectory to a phase angle control scheme over a time period, the reference phase angle trajectory including a plurality of reference phase angle setpoints each at a respective time within the time period.

The propulsion system of any preceding clause, wherein the one or more processors are further configured to: generate a derivative of the reference phase angle trajectory; and modify the speed reference by the derivative of the reference phase angle trajectory prior to comparing the actual speed to the speed reference to generate the speed error.

The propulsion system of any preceding clause, wherein the output of the phase controller module is an electric machine power command, and wherein the one or more processors are further configured to: provide, via an integrator, an integral of the electric machine power command to the fuel controller module.

The propulsion system of any preceding clause, wherein the one or more processors are further configured to: determine when the phase error is within a predetermined range; stop providing the speed error to a fuel controller module to generate the fuel command based on the speed error; and provide the integral of the electric machine power command to the fuel controller module to generate the fuel command based on the integral of the electric machine power command.

The propulsion system of any preceding clause, wherein the one or more processors are further configured to: compare an actual speed to the speed reference to generate a speed error; compare an actual torque to a reference torque to generate a torque error; provide the phase error, the speed error, and the torque error to a multi-input multi-output (MIMO) control module; generate a fuel command, a pitch command, and a torque command with the MIMO control module; and perform one or more control actions.

A method of operating a propulsion system, the propulsion system comprising at least two propulsors, the at least two propulsors each comprising a fan, the method comprising: determining an actual pairwise phase difference between a pair of propulsors of the at least two propulsors; generating a reference phase angle for the pair of propulsors; comparing the actual pairwise phase difference to the reference phase angle to generate a phase error; providing the phase error to a phase controller module to generate an output based on the phase error; and adjusting a speed of at least one propulsor of the at least two propulsors based on the output to drive the phase error towards zero.

The method of any preceding clause, wherein each propulsor of the at least two propulsors further comprises a shaft coupled to the fan and an electric machine operably connected to the shaft, and wherein the method further comprises: providing the phase error to the phase controller module to generate the output as an electric machine power command that is based on the phase error; and adjusting an amount of power transferred between the electric machine and the shaft based on the electric machine power command.

The method of any preceding clause, wherein each propulsor of the at least two propulsors further comprises a fuel delivery system operably connected to a combustion section, and wherein the method further comprises: generating a speed reference for one or more propulsors of the at least two propulsors; receiving an actual speed of the propulsor of the at least two propulsors; comparing the actual speed to the speed reference to generate a speed error; providing the speed error to a fuel controller module to generate a fuel command based on the speed error; and adjusting an amount of fuel supplied to the combustion section of the propulsor of the at least two propulsors with the fuel delivery system to drive the speed error towards zero.

The method of any preceding clause, wherein the method further comprises: generating, with the phase controller module, a speed reference modifier for the propulsor of the at least two propulsors based on the phase error as the output; and modifying the speed reference with the speed reference modifier prior to comparing the actual speed to the speed reference to generate the speed error.

The method of any preceding clause, wherein the method further comprises: determining whether the phase error is less than or exceeds an error threshold; generating, when the phase error is determined to be less than an error threshold, only an electric machine power command as the output based on the phase error; adjusting a speed of at least one propulsor of the at least two propulsors based on the output.

The method of any preceding clause, wherein method further comprises: determining whether the phase error is less than or exceeds an error threshold; generating, when the phase error is determined to exceed an error threshold, only a speed reference modifier for the propulsor of the at least two propulsors based on the phase error as the output; and adjusting a speed of at least one propulsor of the at least two propulsors based on the output.

The method of any preceding clause, wherein the method further comprises: providing, via a trajectory planner, a reference phase angle trajectory to the phase controller module over a time period, the reference phase angle trajectory including a plurality of reference phase angle setpoints each at a respective time within the time period.

The method of any preceding clause, wherein the method further comprises: generating a derivative of the reference phase angle trajectory; and modifying the speed reference by the derivative of the reference phase angle trajectory prior to comparing the actual speed to the speed reference to generate the speed error.

The method of any preceding clause, wherein the output of the phase controller module is an electric machine power command, and wherein method further comprises: provide, via an integrator, an integral of the electric machine power command to the fuel controller module.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A propulsion system comprising:
   at least two propulsors, each of the at least two propulsors comprising a fan; and
   a controller having one or more processors configured to implement controller logic, in implementing the controller logic, the one or more processors are configured to:
     determine an actual pairwise phase difference between a pair of propulsors of the at least two propulsors;
     provide, via a trajectory planner, a reference phase angle trajectory, the reference phase angle trajectory including a plurality of reference phase angle setpoints each corresponding to a respective time within a time period;
     compare the actual pairwise phase difference to one of the reference phase angle setpoints to generate a phase error;
     provide the phase error to a phase controller module to generate an output based on the phase error; and
     adjust a speed of at least one propulsor of the at least two propulsors based on the output to drive the phase error towards zero.

2. The propulsion system of claim 1, wherein each propulsor of the at least two propulsors further comprises a shaft coupled to the fan and an electric machine operably connected to the shaft, and wherein the one or more processors, in implementing a phase angle control scheme, are configured to:
   provide the phase error to the phase controller module to generate the output as an electric machine power command that is based on the phase error; and
   adjust an amount of power transferred between the electric machine and the shaft based on the electric machine power command.

3. The propulsion system of claim 1, wherein each propulsor of the at least two propulsors further comprises a fuel delivery system operably connected to a combustion section, wherein the one or more processors, in implementing a speed control scheme, are further configured to:
   generate a speed reference for one or more propulsors of the at least two propulsors;
   receive an actual speed of the one or more propulsors of the at least two propulsors;
   compare the actual speed to the speed reference to generate a speed error;
   provide the speed error to a fuel controller module to generate a fuel command based on the speed error; and
   adjust an amount of fuel supplied to the combustion section of the one or more propulsors of the at least two propulsors with the fuel delivery system to drive the speed error towards zero.

4. The propulsion system of claim 3, wherein the one or more processors are further configured to:
   generate, with the phase controller module, a speed reference modifier for the one or more propulsors of the at least two propulsors based on the phase error as the output; and
   modify the speed reference with the speed reference modifier prior to comparing the actual speed to the speed reference to generate the speed error.

5. The propulsion system of claim 3, wherein the one or more processors are further configured to:
   generate a derivative of the reference phase angle trajectory; and
   modify the speed reference by the derivative of the reference phase angle trajectory prior to comparing the actual speed to the speed reference to generate the speed error.

6. The propulsion system of claim 3, wherein the output of the phase controller module is an electric machine power command, and wherein the one or more processors are further configured to:
   provide, via an integrator, an integral of the electric machine power command to the fuel controller module.

7. The propulsion system of claim 6, wherein the one or more processors are further configured to:
   determine when the phase error is within a predetermined range;
   stop providing the speed error to the fuel controller module to generate the fuel command based on the speed error; and
   provide the integral of the electric machine power command to the fuel controller module to generate the fuel command based on the integral of the electric machine power command.

8. The propulsion system of claim 1, wherein the one or more processors are further configured to: determine whether the phase error is less than or exceeds an error threshold; generate, when the phase error is determined to be less than the error threshold, only an electric machine power command as the output based on the phase error; adjust the speed of at least one propulsor of the at least two propulsors based on the output.

9. The propulsion system of claim 1, wherein the one or more processors are further configured to:
   determine whether the phase error is less than or exceeds an error threshold;
   generate, when the phase error is determined to exceed the error threshold, only a speed reference modifier for the at least one propulsor of the at least two propulsors based on the phase error as the output; and
   adjust the speed of the at least one propulsor of the at least two propulsors based on the output.

10. The propulsion system of claim 1, wherein the one or more processors are further configured to:
    compare an actual speed to a speed reference to generate a speed error;
    compare an actual torque to a reference torque to generate a torque error;
    provide the phase error, the speed error, and the torque error to a multi-input multi-output (MIMO) control module;

generate a fuel command, a pitch command, and a torque command with the MIMO control module; and perform one or more control actions.

11. A method of operating a propulsion system, the propulsion system comprising at least two propulsors, the at least two propulsors each comprising a fan, the method comprising:

determining an actual pairwise phase difference between a pair of propulsors of the at least two propulsors;

providing, via a trajectory planner, a reference phase angle trajectory, the reference phase angle trajectory including a plurality of reference phase angle setpoints each corresponding to a respective time within a time period;

comparing the actual pairwise phase difference to one of the plurality of reference phase angle setpoints to generate a phase error;

providing the phase error to a phase controller module to generate an output based on the phase error; and adjusting a speed of at least one propulsor of the at least two propulsors based on the output to drive the phase error towards zero.

12. The method of claim 11, wherein each propulsor of the at least two propulsors further comprises a shaft coupled to the fan and an electric machine operably connected to the shaft, and wherein the method further comprises:

providing the phase error to the phase controller module to generate the output as an electric machine power command that is based on the phase error; and adjusting an amount of power transferred between the electric machine and the shaft based on the electric machine power command.

13. The method of claim 11, wherein each propulsor of the at least two propulsors further comprises a fuel delivery system operably connected to a combustion section, and wherein the method further comprises:

generating a speed reference for one or more propulsors of the at least two propulsors;

receiving an actual speed of the one or more propulsors of the at least two propulsors;

comparing the actual speed to the speed reference to generate a speed error;

providing the speed error to a fuel controller module to generate a fuel command based on the speed error; and adjusting an amount of fuel supplied to the combustion section of the propulsor of the at least two propulsors with the fuel delivery system to drive the speed error towards zero.

14. The method of claim 13, wherein the method further comprises:

generating, with the phase controller module, a speed reference modifier for the propulsor of the at least two propulsors based on the phase error as the output; and modifying the speed reference with the speed reference modifier prior to comparing the actual speed to the speed reference to generate the speed error.

15. The method of claim 13, wherein the method further comprises:

generating a derivative of the reference phase angle trajectory; and modifying the speed reference by the derivative of the reference phase angle trajectory prior to comparing the actual speed to the speed reference to generate the speed error.

16. The method of claim 13, wherein the output of the phase controller module is an electric machine power command, and wherein the method further comprises:

providing, via an integrator, an integral of the electric machine power command to the fuel controller module.

17. The method of claim 11, wherein the method further comprises:

determining whether the phase error is less than or exceeds an error threshold;

generating, when the phase error is determined to be less than the error threshold, only an electric machine power command as the output based on the phase error;

adjusting the speed of the at least one propulsor of the at least two propulsors based on the output.

18. The method of claim 11, wherein the method further comprises:

determining whether the phase error is less than or exceeds an error threshold;

generating, when the phase error is determined to exceed the error threshold, only a speed reference modifier for the propulsor of the at least two propulsors based on the phase error as the output; and adjusting the speed of the at least one propulsor of the at least two propulsors based on the output.

* * * * *